United States Patent
Immel

(10) Patent No.: US 6,462,740 B1
(45) Date of Patent: Oct. 8, 2002

(54) SYSTEM FOR IN-SCENE CLOTH MODIFICATION

(75) Inventor: David Stanley Immel, Santa Barbara, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/363,691

(22) Filed: Jul. 30, 1999

(51) Int. Cl.$^7$ ............................................... G06T 15/70
(52) U.S. Cl. ........................................ 345/473; 345/418
(58) Field of Search ................................. 345/418, 419, 345/473, 474, 421, 425, 629, 582, 646

(56) References Cited

U.S. PATENT DOCUMENTS

| | | | |
|---|---|---|---|
| 4,888,713 A | * 12/1989 | Falk | 345/582 |
| 5,255,352 A | * 10/1993 | Falk | 345/425 |
| 5,309,549 A | * 5/1994 | Iwamoto | 345/421 |
| 5,504,845 A | * 4/1996 | Vecchione | 345/419 |
| 5,850,222 A | * 12/1998 | Cone | 345/418 |
| 6,307,568 B1 | * 10/2001 | Rom | 345/629 |

OTHER PUBLICATIONS

Shewchuk, Jonathan, "A Two–Dimensional Quality Mesh Generator and Delaunay Triangulator", School of Computer Science, Carnegie Mellon Univ., pps. 1–2.

Fujimoto, Akira et al., "ARTS: Accelerated Ray–Tracing System", IEEE CG&A, 1986, pps. 16–26.

Beier, Thaddeus et al., "Feature–Based Image Metamorphosis", Computer Graphics, No. 26, 1992, pps. 35–42.

Hing N. Ng, et al., "Computer Graphics Techniques for Modeling Cloth," Computer Graphics in Textiles and Apparel, Sep. 1996, pp. 28–41.

Pascal Volino, et al., "An Evolving System for Simulating Clothes on Virtual Actors," Computer Graphics in Textiles and Apparel, Sep. 1996, pp. 42–51.

Bernhard Eberhardt, et al, "A Fast Flexible Particle–System Model for Cloth Draping," Computer Graphics in Textiles and Apparel, Sep. 1996, pp. 52–59.

* cited by examiner

Primary Examiner—Mark Zimmerman
Assistant Examiner—Huedung X. Cao
(74) Attorney, Agent, or Firm—Staas & Halsey LLP

(57) ABSTRACT

A system for in-scene cloth modification that allows a user to make modifications to cloth during animation of objects associated with the cloth and have the new geometry updated in the in-scene cloth without having to start the animation from the beginning. Modified panels of the cloth are mapped into the counterpart panels of the simulated cloth by morphing the modified panels from a cloth definition into the space of the old panels in the scene. A relaxation of the cloth allows the new panel to take its natural shape in the animation. The mapping, when cloth is added, also includes finding each new panel vertex a location in the original or old panel.

16 Claims, 29 Drawing Sheets

OLD PANEL

NEW PANEL

SIMULATED OLD PANEL

SIMULATED NEW PANEL

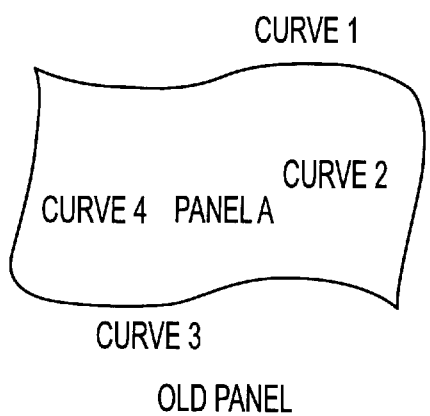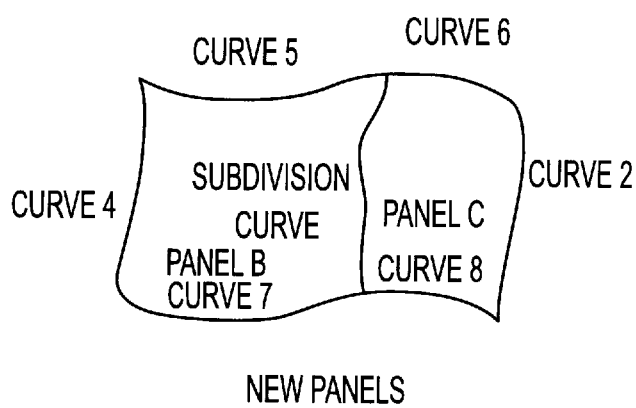
OLD PANEL
FIG. 17A
NEW PANELS
FIG. 17B

SYSTEM FOR IN-SCENE CLOTH MODIFICATION

BACKGROUND OF THE INVENTION

1. Field of the Invention

The present invention is directed to a system for making changes to the cloth associated with animated characters and, more particularly, to making changes to a garment clothing a character after the character has been moved through a series of animated positions without requiring that the animation be restarted after the modifications are made.

2. Description of the Related Art

In animating a character wearing a garment, the garment must first be constructed around the character in some initial pose. Then the character must be animated to its starting pose for the real animation. At anytime during the animation, if the user wants to modify the garment, the simulation conventionally has to restart from its initial construction position. It is very time-consuming to resimulate the garment from its initial construction position to the animation starting position. The time required for the resimulation can range from minutes to hours depending on the complexity of the garment and the difference between the position of the character in which the garment is constructed and the position of the character at the start of the real animation.

What is needed is a system that will allow garment modification without restarting the simulation.

SUMMARY OF THE INVENTION

It is an object of the present invention to allow a garment simulated in an animation to be modified without requiring that the simulation or animation be reset or restarted.

It is another object of the present invention to modify cloth panels in place on a character.

It also an object of the present invention to map a new or modified panel into an old panel in the animation by morphing.

It is an additional object of the present invention to allow animators to animate cloth characters with desired garments thereon in a fast and efficient manner.

It is a further object of the present invention to improve the quality of the animation by allowing more experiments with cloth garments in a given period of time.

The above objects can be attained by a system that allows a user to make modifications to the pattern of a cloth garment and have the new geometry updated in the in-scene garment without having to start the simulation from the beginning. The modifications are made to the garment in a relaxed and posed position in the animation. Modified panels of the garment are mapped into the counterpart panels of the simulated garment. A relaxation of the modified garment allows the new panel to take its natural shape in the simulation. The mapping is done by morphing the new panel into the old panel and finding each new panel vertex a location in the original panel.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 17 illustrates panel subdivision.

DESCRIPTION OF THE PREFERRED EMBODIMENTS

Cloth garments are modeled as sets of curves forming panels which are seamed together. A physical simulation allows the cloth to drape and react to forces and animating characters. The present invention allows a user to make modifications to a garment after it has been simulated, and the new garment will be refit to the simulated garment without having to reset the simulation back to the start.

The present invention maps a new (or modified) garment from the construction configuration to the configuration of the garment at the start of the real animation and/or the current configuration of the garment. Vertex positions for each vertex of the garment are set on the simulated garment in the best positions possible taking into account the adjustments made to the garment. A subsequent small simulation allows the new garment to take its shape, as portions of the garment may have become squashed or stretched due to the mapping process. This "relaxation" simulation is very quick compared to the time to simulate the garment from the beginning.

Figure 1:
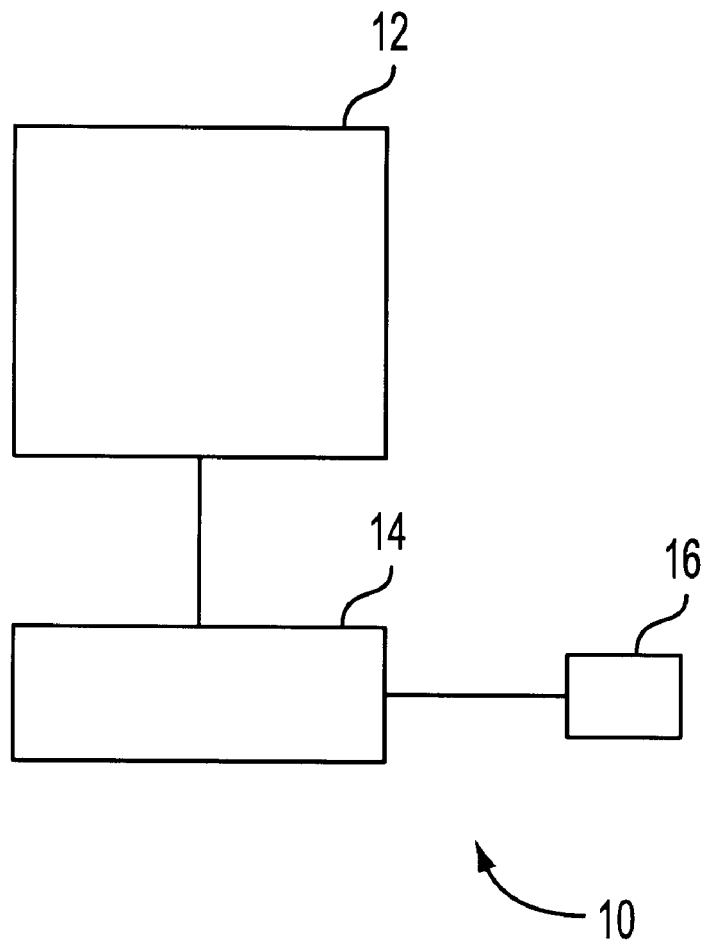
FIG. 1 illustrates the system of the present invention.

The present invention is included in a system 10, such as depicted in FIG. 1, which includes a display 12 upon which a garment covered character is animated and upon which the garment is modified, a computer 14 which performs the processes described herein and an input device 16, such as a mouse or stylus with pad, which is used to control the animation and make garment modifications. The system 10 also includes storage (not shown), such as disc storage and RAM in which the processes of the present invention can be stored. The processes can also be distributed via a network, such as the Internet.

Figure 2:
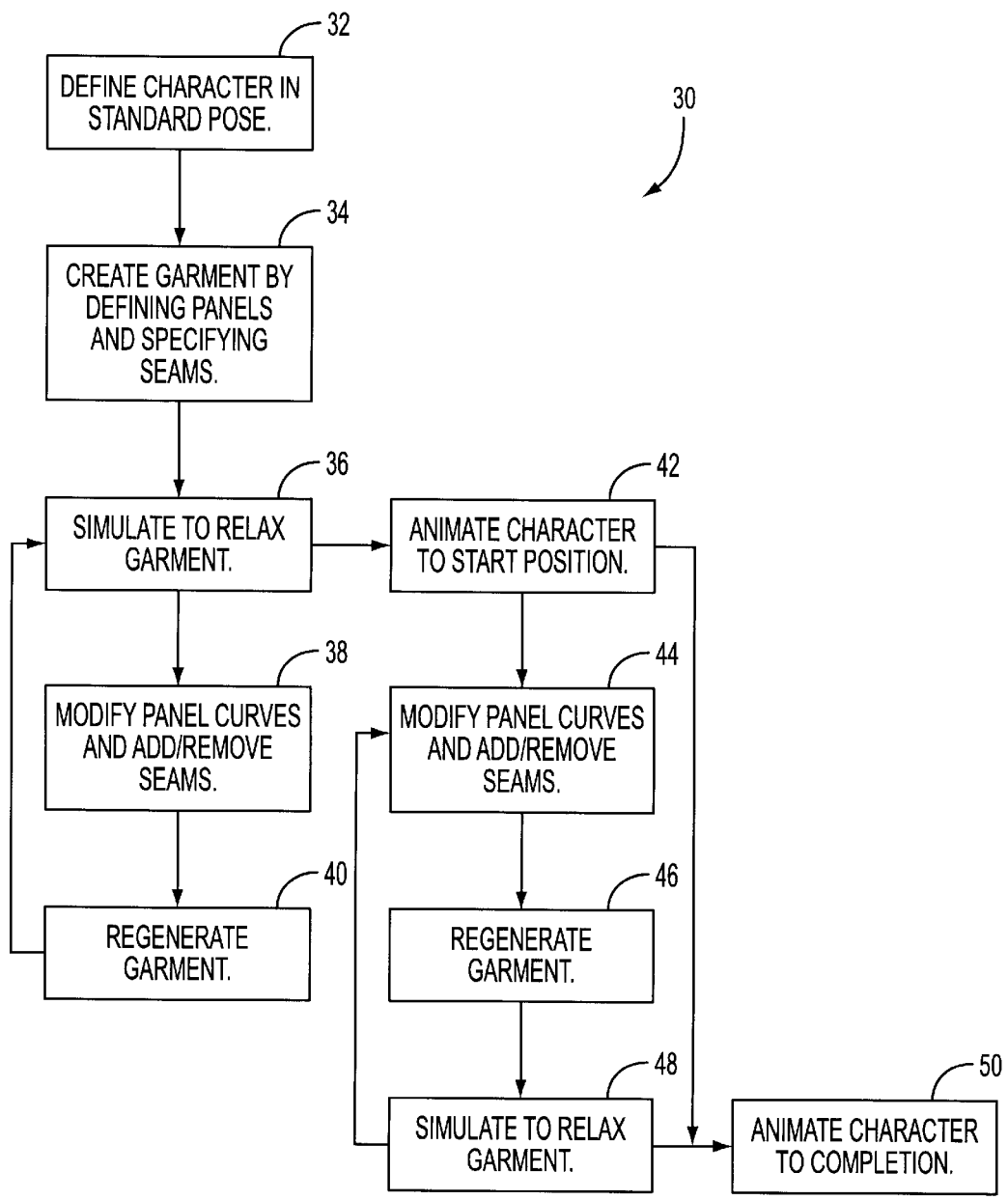
FIG. 2 depicts the garment construction process of the present invention.

The present invention includes a garment construction and modification process in which a garment is constructed on a character and the character is animated. Based on the animation a decision is made to modify the garment, such as because the garment does not flow as well as desired. The garment is modified and reanimated. This process is depicted in FIG. 2 and will be discussed with respect to FIGS. 3–13 and the changing of the length of a garment, particularly a dress.

Figure 3:
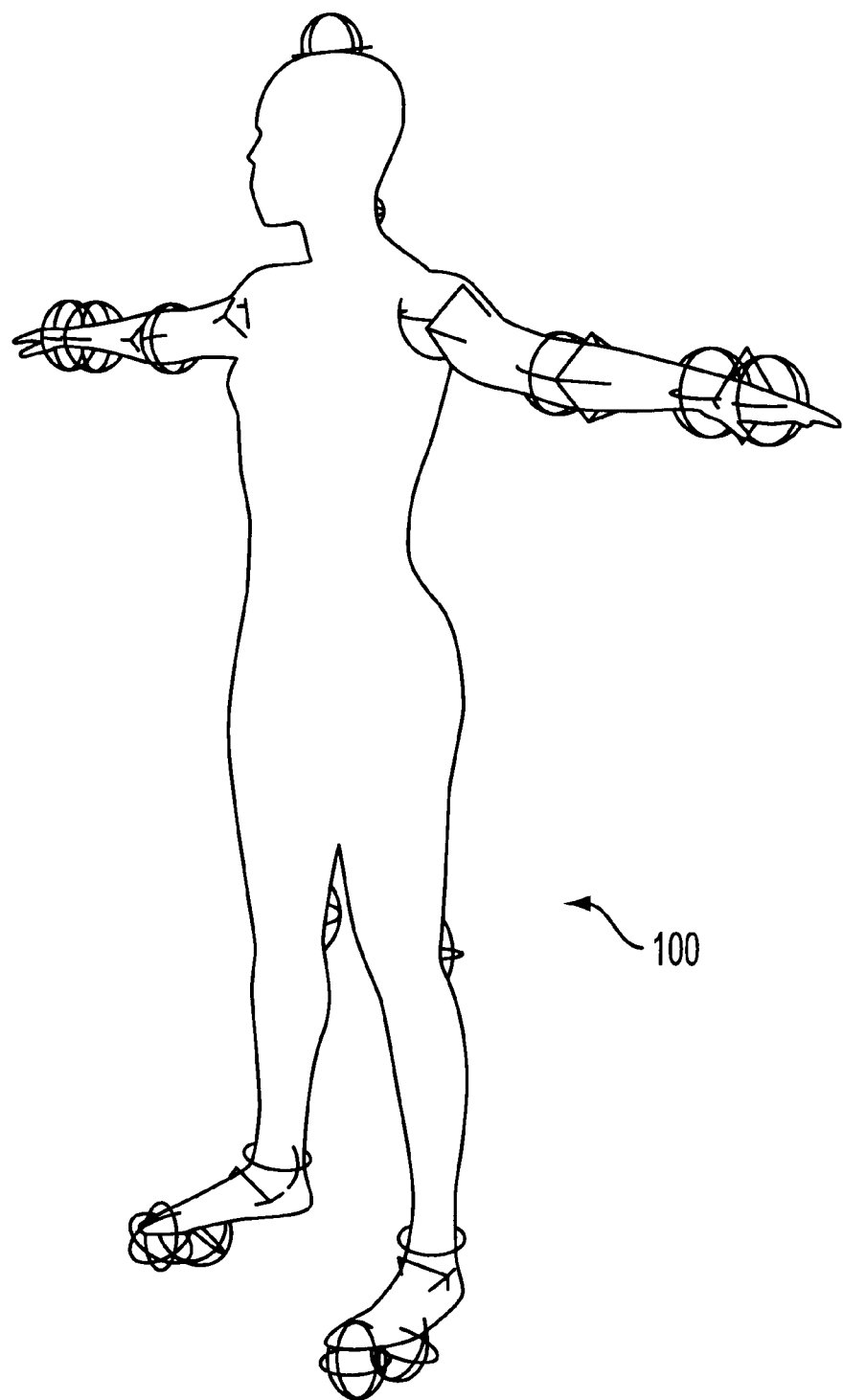
FIGS. 3–13 depict images of results in the construction process.

The garment construction process 30 starts with defining 32 a character in a standard pose, as depicted in FIG. 3. This image shows a character 100 ready to be dressed. The various wireframe lines and curves shown in the figure are used to move the joints of the character and are not relevant here.

Figure 4:
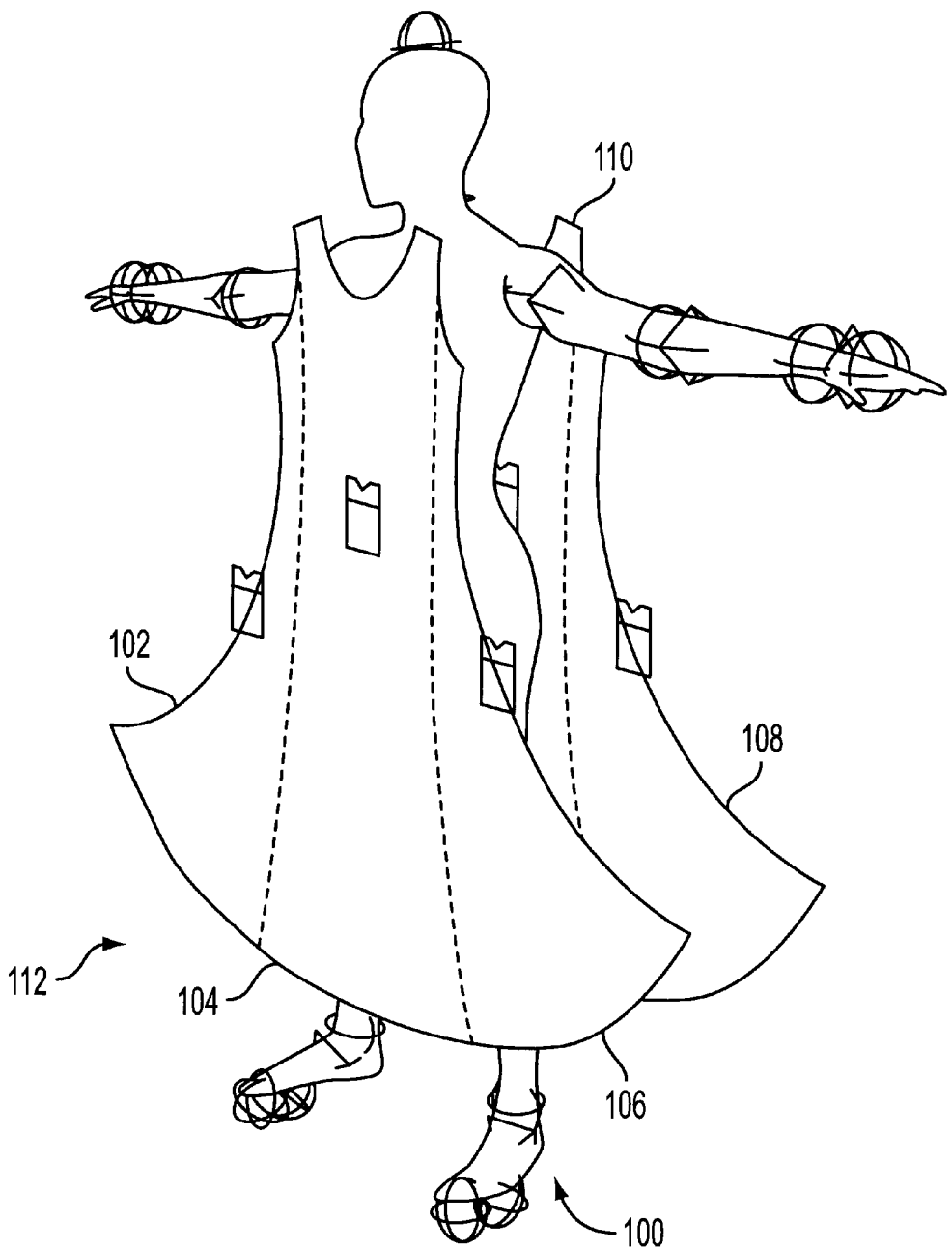
Figure 5:
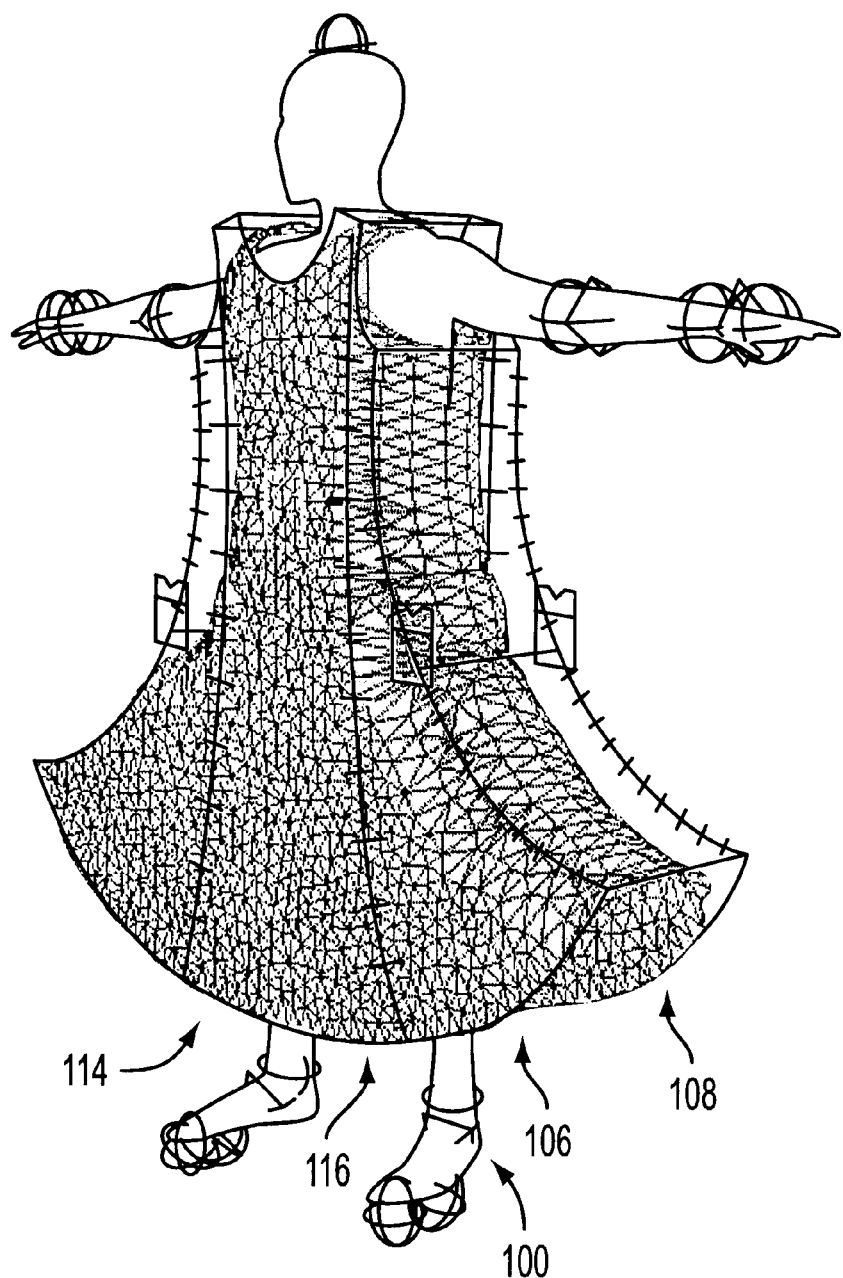

The next operation or action is to conventionally create 34 a garment by defining the panels and seams of the garment as shown in FIG. 4. A panel is defined as a closed, coplanar, non-intersecting loop. In the invention the loop preferably is of a collection of connected NURBS curves. In the FIG. 4 six panels of cloth are defined 102–112 with panel 112 hidden from view. The panels are placed in some desired position in the scene. When clothing a character 100, it is preferable to place them near the character 100 and to each other for seaming purposes. Seams (see FIG. 5) are defined as a curve or pair of curves from the same or different panels whose geometry will be merged. Seaming, a conventional operation, occurs by first ensuring that the same number of vertices are defined along each seam curve (adding or deleting vertexes and retriangulating or retessellating as necessary). Then, corresponding pairs of vertices are merged into a single vertex, and the edges between vertex pairs are merged into a single edge. In FIG. 5 the three front panels are seamed together with two seams 114 and 116 made from the two shared curves. The end panels 106 and 108 of the front and back are seamed together by selecting the end curves from each panel. Notice how the end panels 106 and 108 are merged by joining the geometry along the seam curves and rounding the geometry around the seam to distribute the stress placed on the panels as a result of stretching these panels to meet each other. This rounding technique is described in the proceedings of Siggraph 1992, in the article, "Three Dimensional Apparel CAD System" incorporated by reference herein.

Figure 6:
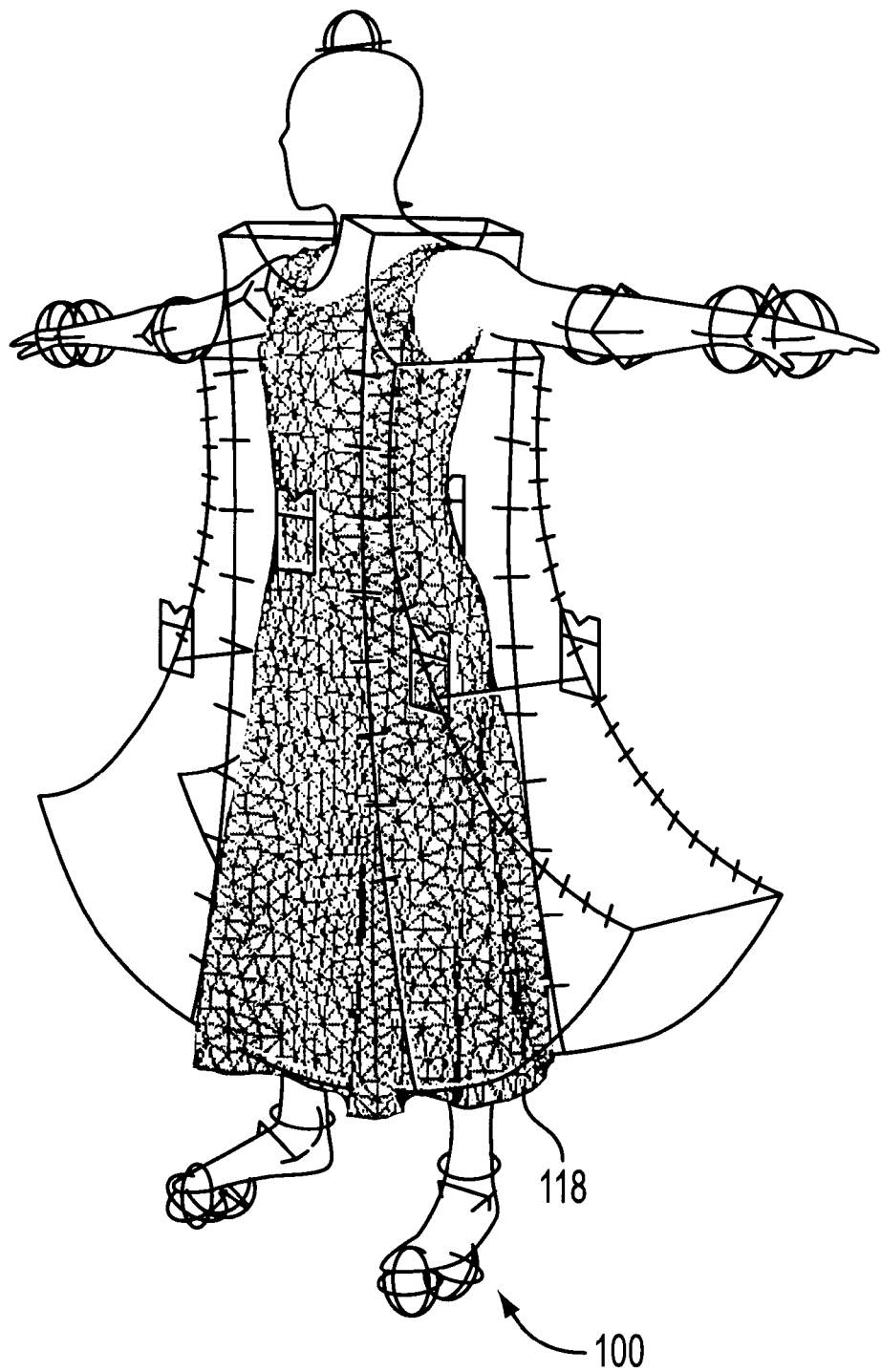

Then, a conventional simulation is run 36. The simulation is run on the character in the original pose to allow the stress introduced by the seaming process to conventionally relax, and to allow the garment 118 to drape over the character 100 taking character shape, gravity, garment characteristics, etc. into account, as shown in FIG. 6. A goal of the simulation is to have each triangle edge length be the length at which that edge was originally defined in the panel before the panel was seamed (called the "rest length") and to have the angles between each neighboring pair of triangles be the angle at which it was defined (called the "rest angle"). The rest angles are initially set to 0 but could be changed by the user. For instance, a user could specify that the angle along the seam between two panels should be 45 degrees. When the two panels are tessellated and seamed, the triangle edges along that seam have their rest angles set to 45 degrees. The relaxation may cause some of the triangles to be stretched because the garment itself is stretched around the character.

Figure 7:
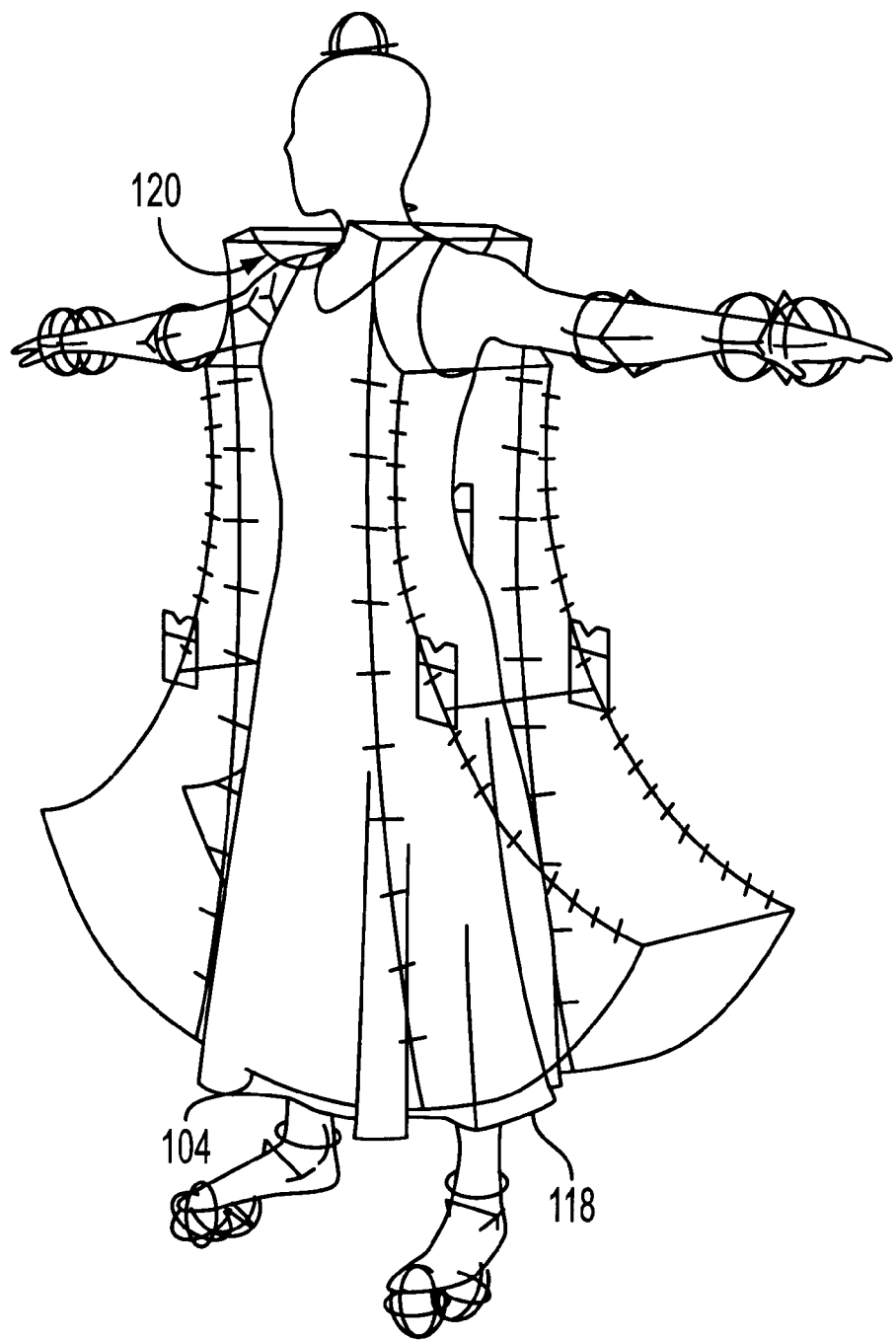

The user can then modify the panel curves as well as add and remove seams 38. For example, the panel curves may be modified to redefine the shape of a panel. This modification uses conventional curve shaping and editing techniques to make the modifications to the panels. In the example of FIG. 7, the curves forming the neckline 120 of the dress garment 118 are modified to raise the neckline. Note that this modification is made to the original panel 104 and the changes in the original panel, now a new or modified panel, need to be mapped to the old panel, the one on the character.

Figure 8:
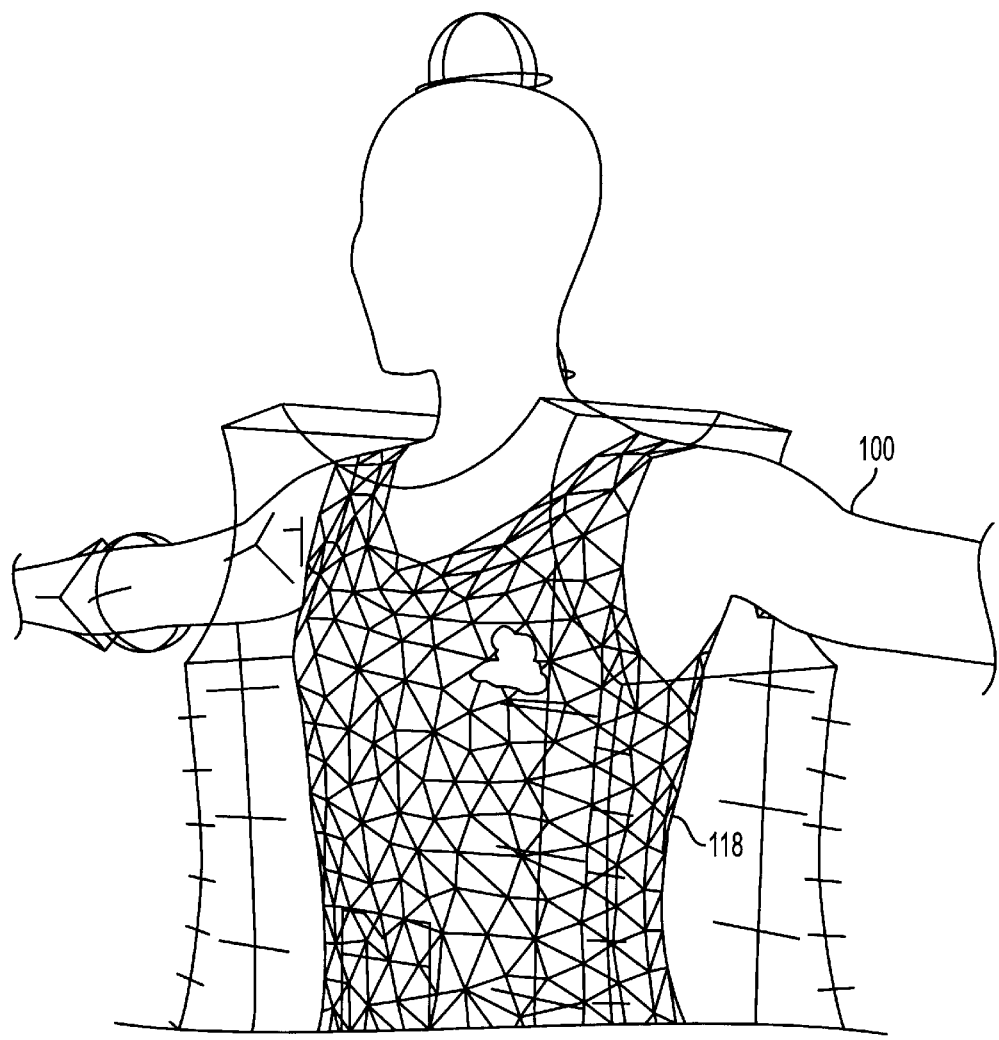

Once the modifications are complete the garment is regenerated 40 based on the new panel curve definitions, as depicted in FIG. 8. During regeneration, the triangle vertices of the new garment are mapped onto the surface of the existing garment. The operation associated with this regeneration will be discussed in more detail later herein. Notice in the area around the neckline in FIG. 8 that the triangles are more compact and irregularly shaped. This is the extra material for the higher neckline being mapped to the existing lower neckline.

Figure 9:
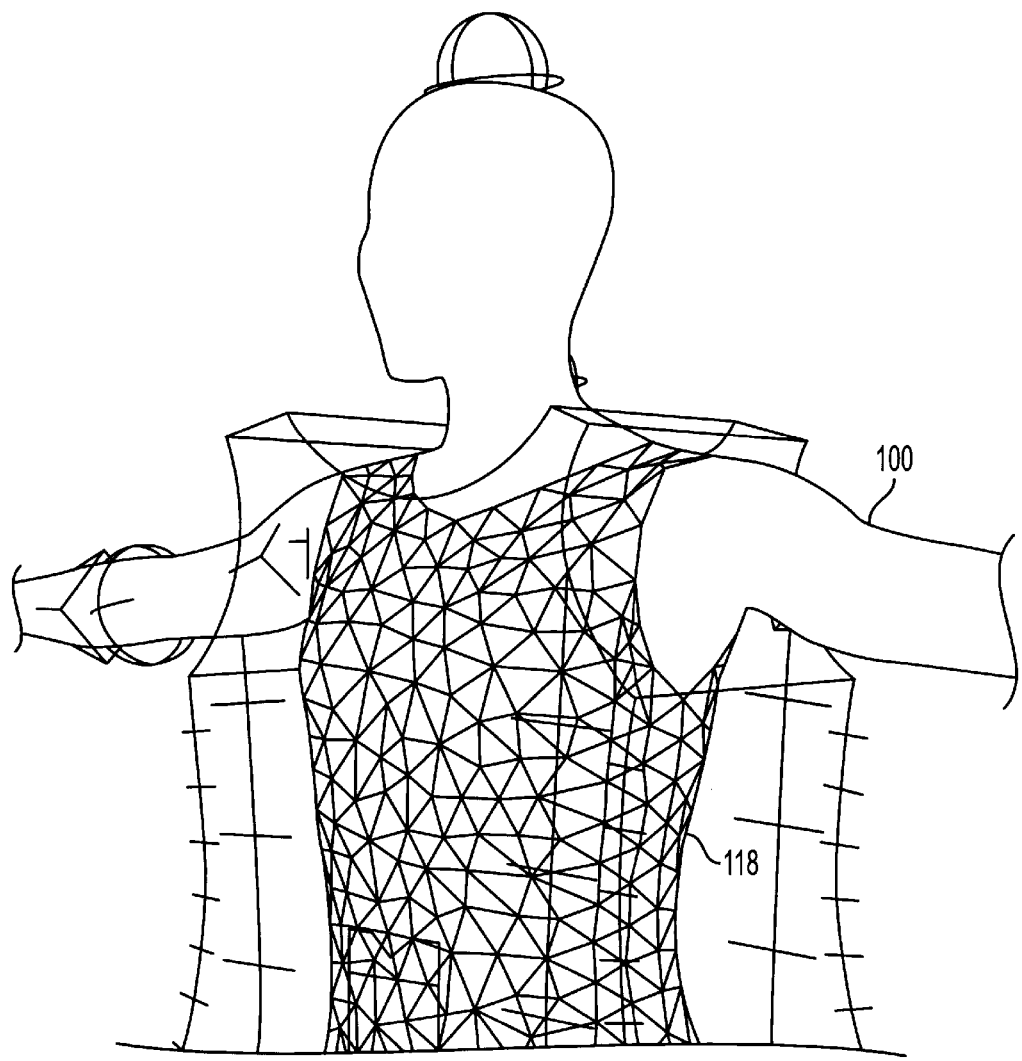

The garment 118 is now simulated 36 (see FIG. 2) again from its current state to allow the new garment to take its own shape as shown in FIG. 9. Some squashing or stretching of the garment may have resulted from being mapped onto the previous state of the garment. In the FIG. 9 notice that the triangles around the neckline are now more regularly shaped and the neckline is now higher. The steps of making panel and seam modifications 38, regenerating the garment 40, and relaxing the new garment 36 can be repeated until the desired garment has been created.

Figure 10:
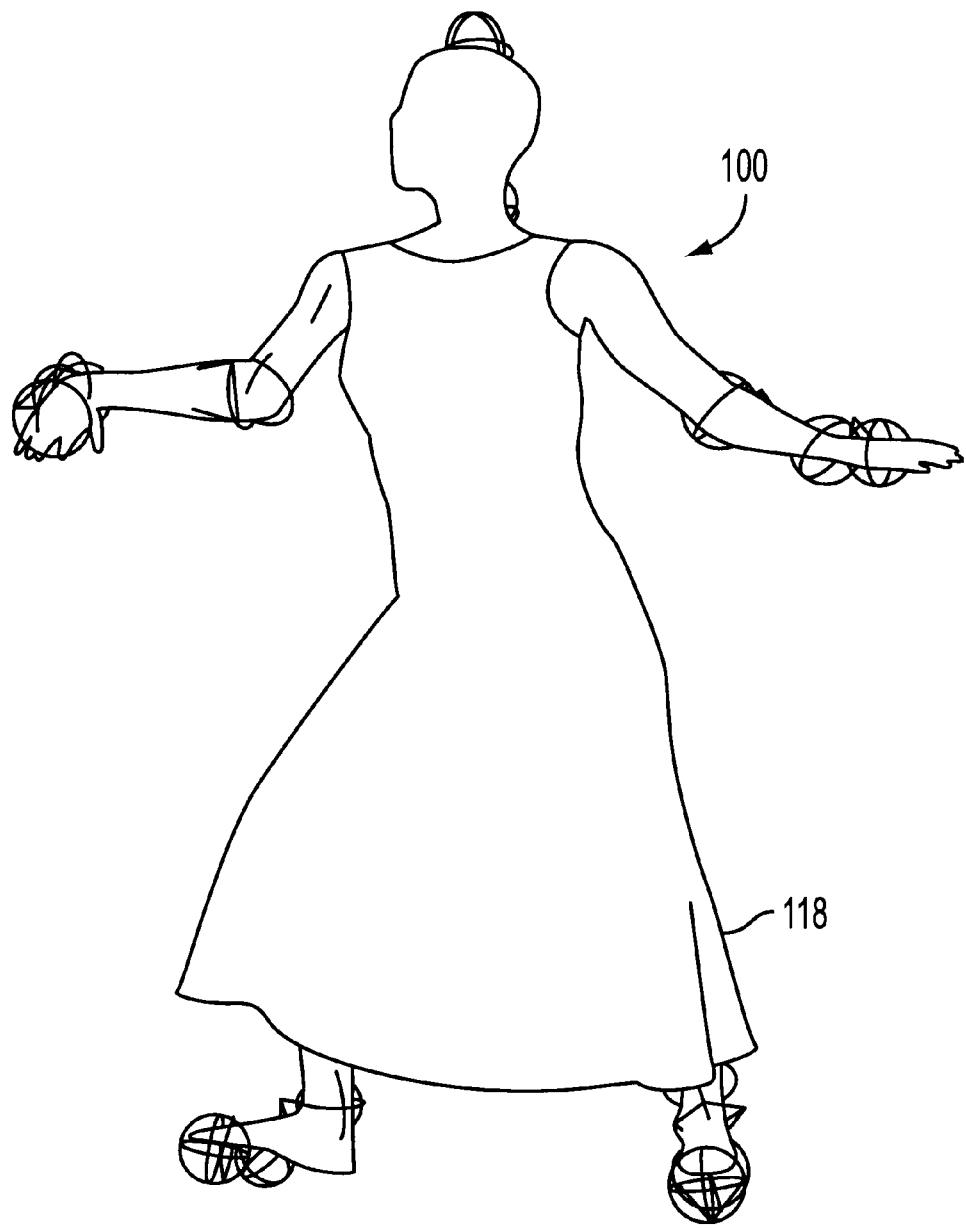

The user now animates 42 the character 100 with the garment 118 thereon into a desired location used for the start frame of a final animation as illustrated in FIG. 10. The garment 118 simulates along with the animating character 100 according to the physical laws and constraints that have been programmed into the simulator.

Figure 11:
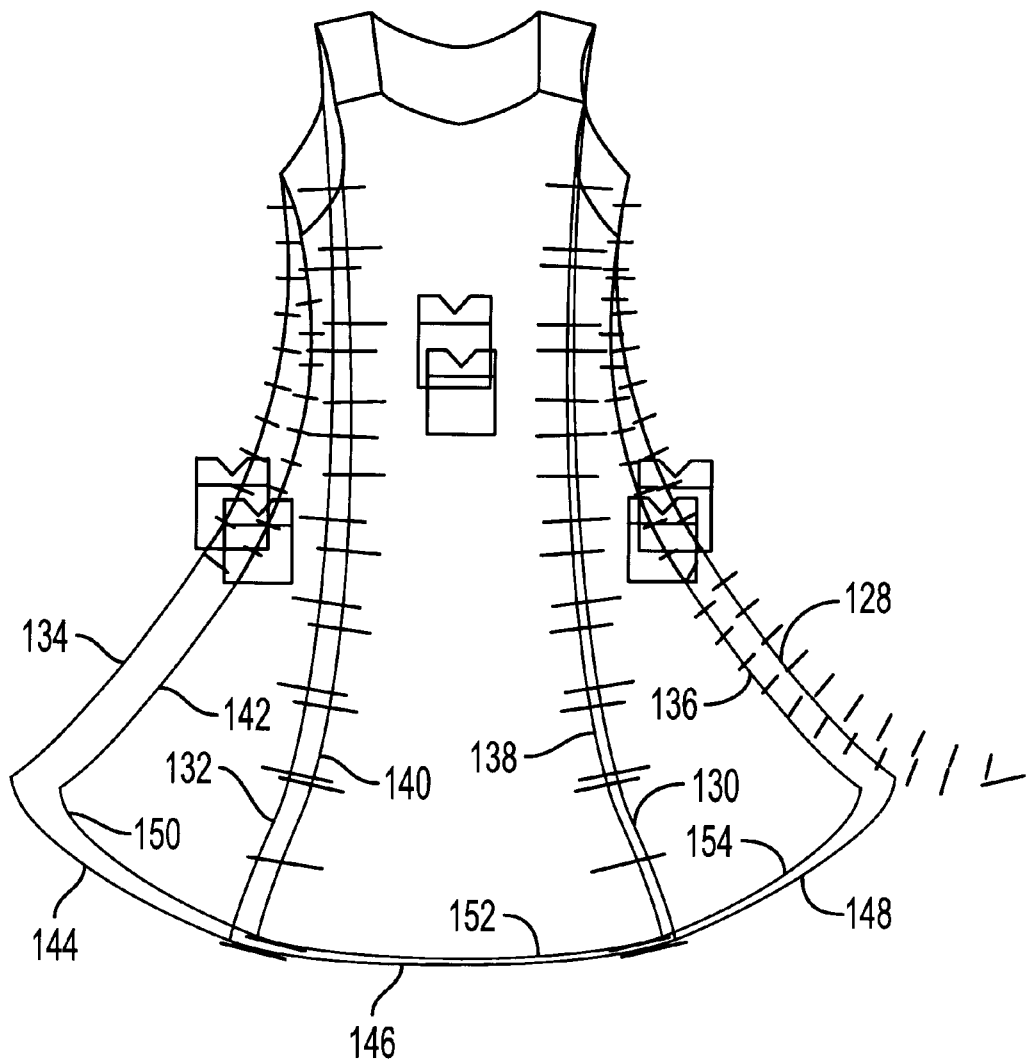

Once the simulation has run for a period of time sufficient to allow the animator to assess whether the garment looks and behaves as desired, the user can stop the animation and modify the panel curves as well as add and remove seams 44. These modifications are made to the original panels 102–112 and the new or modified panels need to be mapped into the old panels. That is, the user may still want to make modifications to the garment after seeing it on the character in a pose more related to the animation. The same steps of modifying the garment definition 44, regenerating the garment 46, and simulating 48 to relax the updated garment can be used here. In FIG. 11, the hemline is shortened by reducing the lengths of the original vertical panel curves shown in FIGS. 4, 5 or 6 producing curves in the front (128, 130, 132 and 134) and curves in the back (136, 138, 140 and 142) and shortening the arcs of the original bottom curves producing curves 144, 146, 148, 150, 152 and 154. The seam stitches in FIG. 11 indicate where the original curves were, especially on the right hand side where the stitches extend out from and beyond the modified curves.

Figure 12:
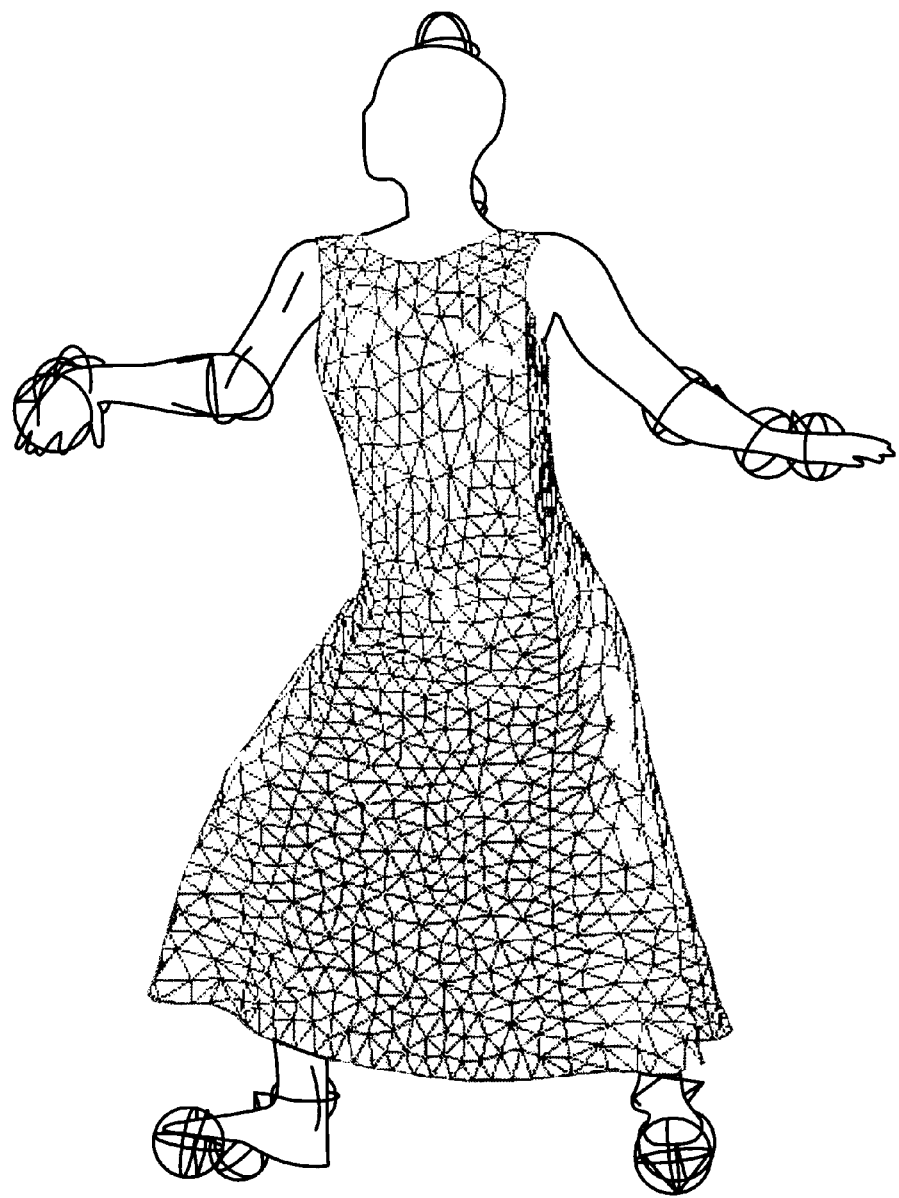

As noted above, the garment is regenerated 46 with the new panel curve definitions and mapped onto the existing garment as shown in FIG. 12. Notice the areas of triangle distortion are more widespread due to the more major modifications made to the panel curves.

Figure 13:
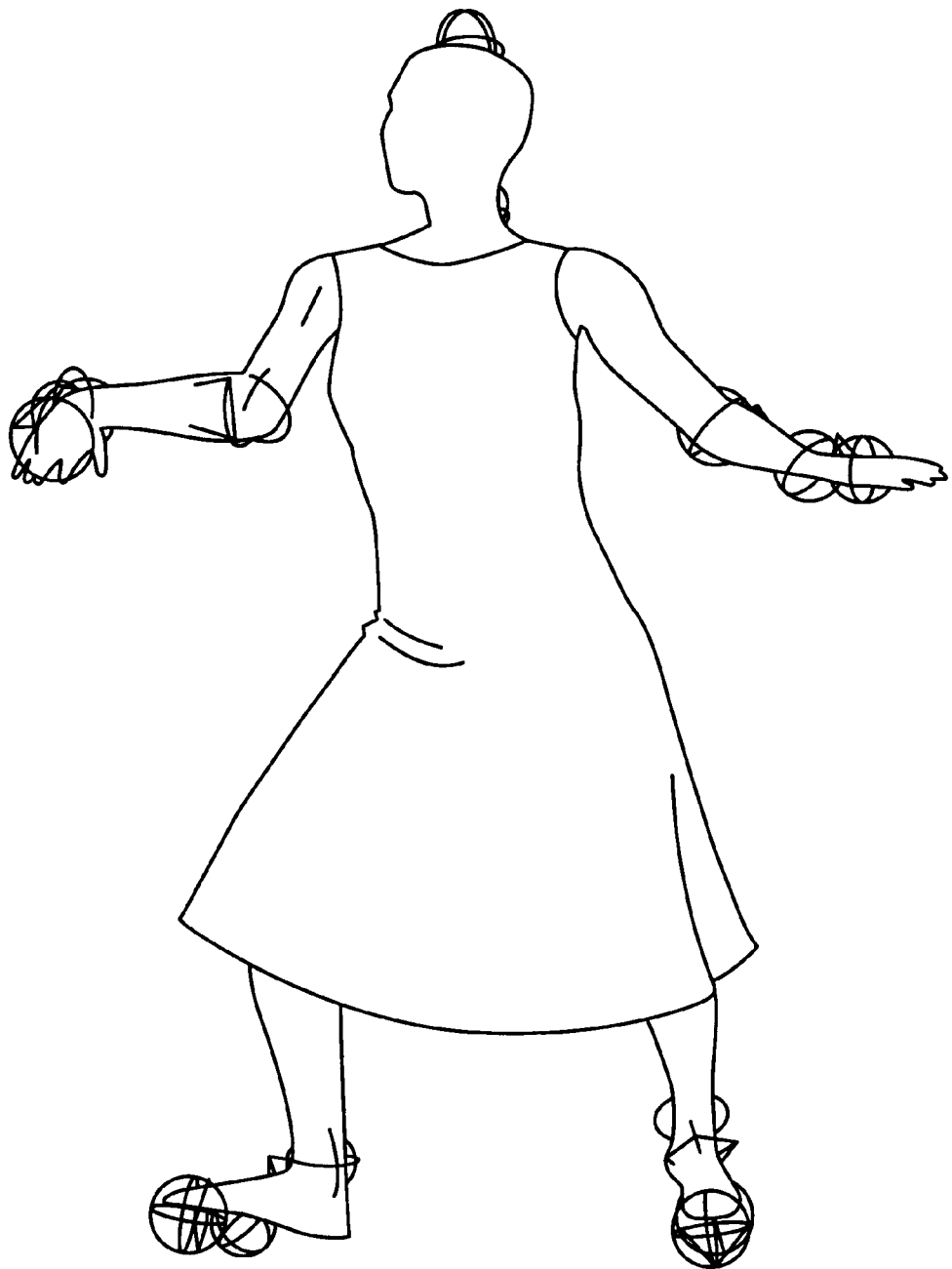

The new garment is then simulated 48 to allow the distortions resulting from the garment regeneration to be resolved as shown in FIG. 13. The process of curve modification, garment regeneration and relaxation can be repeated until the garment has the desired look.

The character is then animated 50 to completion as desired by the user/animator.

Figure 14:
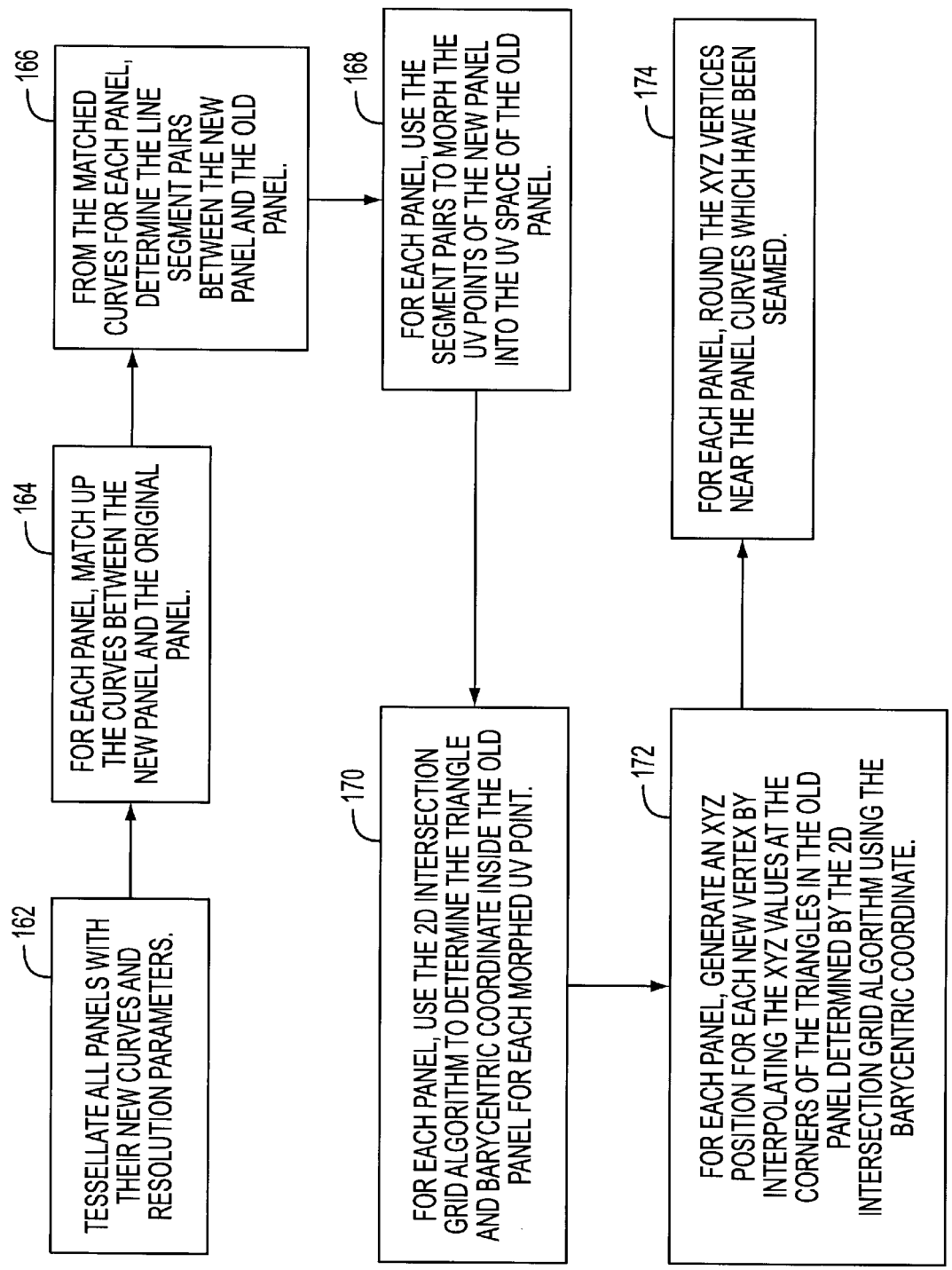
FIG. 14 illustrates garment regeneration.

The flowchart of FIG. 14 orders and briefly describes the steps taken within the boxes 40/46 of FIG. 2. This operation 40/46 regenerates a garment after the user has made modifications to it, including modifying the shapes of curves, subdividing and merging curves and panels, adding and removing seams, and changing the resolutions of panels. The operations will be described in more detail later herein. First, the panels which have new curves and/or new resolution parameters are tessellated 162. Then the curves of the new and original panels are matched 164 and line segment pairs are determined 166. The points of each panel are then morphed 168 from the new into the old panels. The triangles and barycentric coordinates for each of the UV points is determined 170. The XYZ position for each new vertex is determined 172 and the vertices are rounded 174 as needed.

As part of the garment regeneration it may sometimes be necessary to triangulate or tessellate (or retessellate) the cloth panel, such as when a panel of the garment is made bigger and cloth needs to be added. Tessellation or triangulation is a conventional operation and an algorithm for such can be located at http://www.cs.cmu.edu/~quake/triangle.html, incorporated by reference herein. Additional information on surface representation and evaluation can be found in "Computer Graphics, Principles and Practice" by Foley, vanDam, Feiner, and Hughes, 1990, Addison-Wesley, also incorporated by reference herein. In general, it is desirable to generate a tessellation which will minimize any artifacts in the final appearance or animation of the garment which might be attributed to the tessellation itself as opposed to the simulation. The tessellation defines the triangle edges which are the only places in the garment where bending can take place. How a garment bends, wrinkles, and folds is important to the final appearance of the garment, so the tessellation is critical. If the tessellation is too coarse and there are few edges, the garment may appear too stiff as it can only bend in a few places. Or if the tessellation is fine in one area but coarse in another area, the bending behavior of the garment will be different across the garment. Or if the edges of the tessellated garment all run horizontally and vertically as in a regular grid, the garment will be able to easily bend horizontally and vertically but will have difficulty bending along a diagonal. With these considerations in mind it is preferable use a tessellation which will create triangles with the following characteristics. First, the triangles should all be roughly the same size. This will create a homogeneous garment where the bend stiffness will be the same throughout the garment. Second, the placement of the tessellated vertices across a panel should be "semi-random", meaning random with some restrictions. The placement of the vertices should be such that they are all roughly equally spaced and form triangles whose edges are then roughly the same length. Beyond that, the placement is preferably random. This gives a tessellation in which there is no bias towards bending in one direction over another across the garment. In addition since all edges are roughly the same length, no part of the garment will be stiffer than any other part.

Figure 15A:
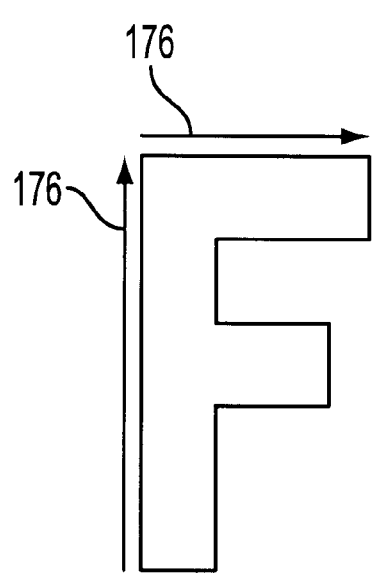
FIGS. 15 and 16 depict morphing.
Figure 15B:
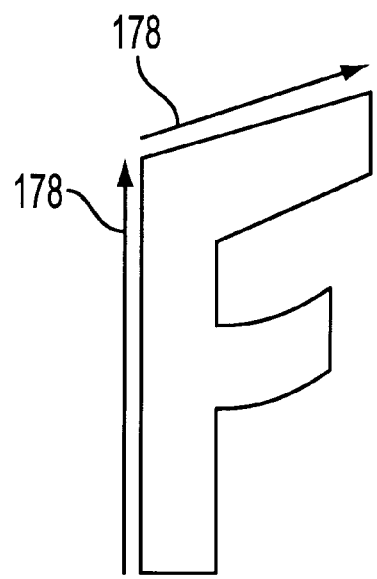
Figure 16A:
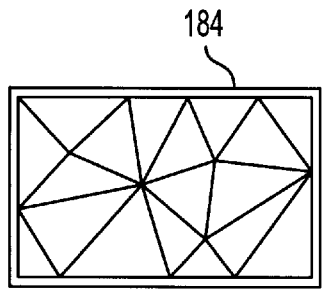
Figure 16B:
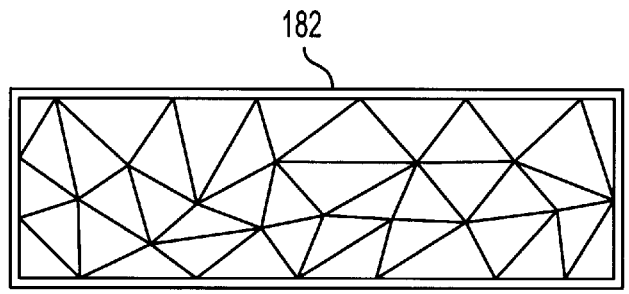
Figure 16C:
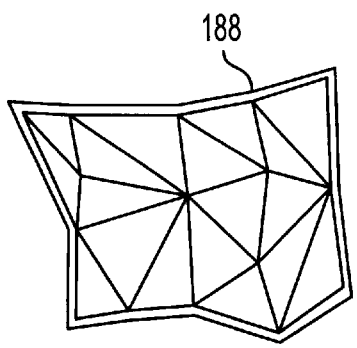
Figure 16D:
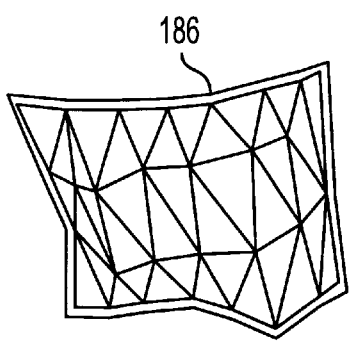

In regenerating (40/46) a garment the new panel needs to be morphed into the old panel. To do this, the new panel is mapped into the old panel. The type of morphing used in mapping cloth panels involves two dimensional warping as described in the Siggraph '92 paper by Beier and Neely, entitled "Feature-Based Image Metamorphosis" incorporated by reference herein but where vertexes are warped rather than pixels. The features of this algorithm which are particularly useful in the context of panels are: the algorithm is two dimensional, a morph is defined by a set of displaced line segments, and the computation is simple. Shown in FIG. 15 is the basic concept of the morph. A line segment on an image sets up a transformation for the pixels in its vicinity when the line moves between frames of an animation. Multiple line segments (control segments) apply a weighted transform resulting in the image morphing from the orientation of the lines 176 at the start frame to the orientation of the lines 178 at the end frame.

Garment or cloth panel perimeters are approximated by a series of line segments. These line segments are the morphing control segments. The panel itself is defined in a UV parametric space, and when it is tessellated or triangulated, a three dimensional point is associated with each UV tessellated vertex. A morph is applied by taking the new set of perimeter line segments defining the new panel 182 (FIG. 16) and mapping them to the set of corresponding line segments in the old panel 184. This mapping is applied to each UV vertex of the new panel, resulting in a UV position in the old panel. Because the panel is defined as the interior of a closed loop, each new UV position has a corresponding old UV position. Given an old UV position, the triangle that contains it can be located, and the three dimensional simulated positions of its vertices are interpolated to determine the position of the new vertex. The extreme case where vertices morph outside the closed loop can be detected and the morph can be applied in successive steps of less extreme segment transformations until the whole morph is complete. The result is that the new simulated panel 186 will be mapped to fill the simulated configuration 188 of the old panel. Since the new panel is most likely not the same two dimensional shape as the old panel, the new panel may be squashed or stretched as it is mapped into the old panel. A subsequent relaxation of the cloth is performed as discussed above.

There are six editing operations that can be made to a panel. These editing operations need to be performed and the effects on the new panel accounted for before the morphing from the new panel to the old panel occurs. The editing operations include changing the resolution of a panel, changing the shape of a seam or panel curve, subdividing a panel, merging two adjacent panels, adding a seam between two panels, and removing a seam between two panel. These operations involve two basic steps, generating corresponding pairs of line segments between the new panel and old panel, and mapping each point of the new panel into the space occupied by the old panel. The first step will be slightly different for each operation, but the second step will be identical. Each operation is described below.

In changing the resolution of a panel, before retessellation, the set of UV points along the perimeter of the panel are saved. This can be done when the panel is first tessellated. The new panel can then be tessellated. The set of UV points along each curve around the perimeter form the set of line segments representing the curve. For each curve in the new panel, the number of UV points is compared with the number of saved UV points for the corresponding curve of the old panel. If the number of points in the old panel curve is less than the number of points in the new panel curve, then points are added to the old curve set by sorting the distance between neighboring points and adding points at the midpoints between the old points, starting from the points with the largest distances between them. Likewise, if the number of points in the new panel curve is less than the number of points in the old panel curve, then the reverse operation is applied.

Changing the shape of a panel curve does not involve any topological changes to the panels it helps define. The particular shape of the curve does not affect the mapping operation, and so this is treated in the same manner as changing resolutions.

To subdivide a panel, the user must select a panel to subdivide, and a curve which cuts across it. The cutting curve becomes a seam curve in each panel as shown in FIG. 17. In this example, the tessellated panel curves 1 through 4 of panel A have been saved. To remap panels B and C, the tessellated curves 5 and 6 are concatenated and matched with curve 1, and likewise for curves 7 and 8. The tessellated UV points of both panels B and C will use the mapping back to panel A.

Figures 18A, 18B:
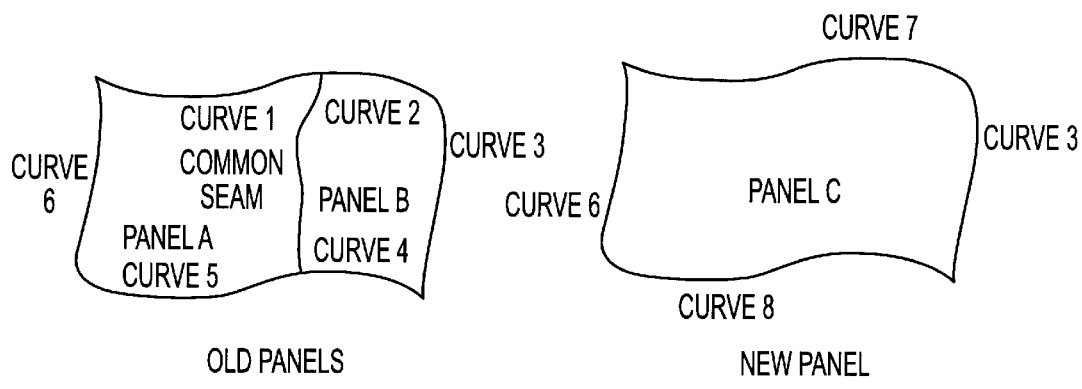
FIG. 18 illustrates panel merging.

To merge a panel, the user must select two adjacent panels. As in the panel subdivision operation, the neighboring curves on each side of the common seam are concatenated to correlate with the larger curves of the new merged panel, as shown in FIG. 18. In this example, panels A and B have been selected to be merged. The seams of the two panels are compared to find the common seam. From the common seam, the neighboring seams of each panel are determined. In the example, curve 1's neighbor is curve 2, and curve 5's neighbor is curve 4. When panels A and B are tessellated, the tessellated neighbor curves are concatenated and correspond to the merged curves. Curves 1 and 2 correlate with curve 7, and curves 5 and 4 correlate with curve 8.

Adding and removing seams can change the resolution of the panel to which the seam is associated. Since the number of segments along the curves forming the seams must be the same to merge the geometries of the two panels, the generated UV points along a seam curve may be more than or less than the number of generated points along the curve before the seaming operation. For instance, when a panel of high resolution is seamed to a panel of low resolution, the seam curve of the panel with the lower resolution will have to have more UV points generated for it to match the higher number of points along the seam curve of the high resolution panel. Likewise, when such a seam is removed, the lower resolution panel no longer needs to generate a higher number of UV points for the curve which had been seamed.

In allowing a garment to be modified during an animation, as discussed above, the user may make changes that change the number of curves in a panel. When this occurs the new or changed curves need to be matched between corresponding or adjacent panels. Such a situation could arise if the user divides a curve into parts or if the user disables the updating of the garment while several editing operations are made. When the surface is reenabled, the curves which define the panel may have changed substantially. The essential problem to be solved in this case is: for each curve in a newly defined panel, find an associated curve(s) or portion of a curve in the original panel which most closely matches the new curve.

Figure 19A:
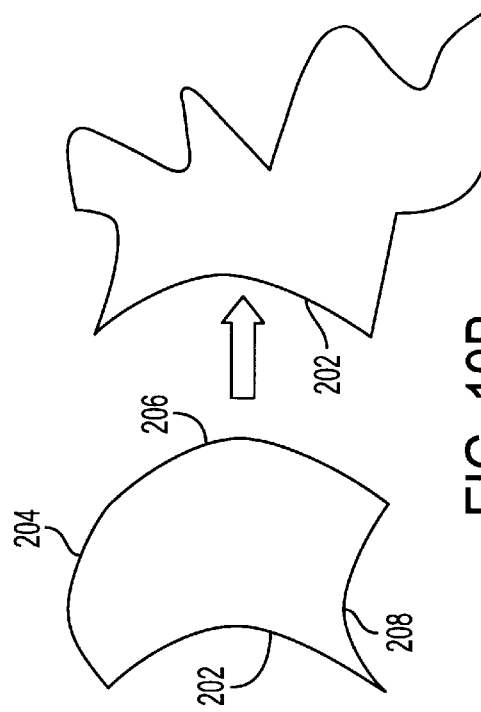
FIGS. 19 (A–C) illustrate the issues of curve matching.
Figure 19B:
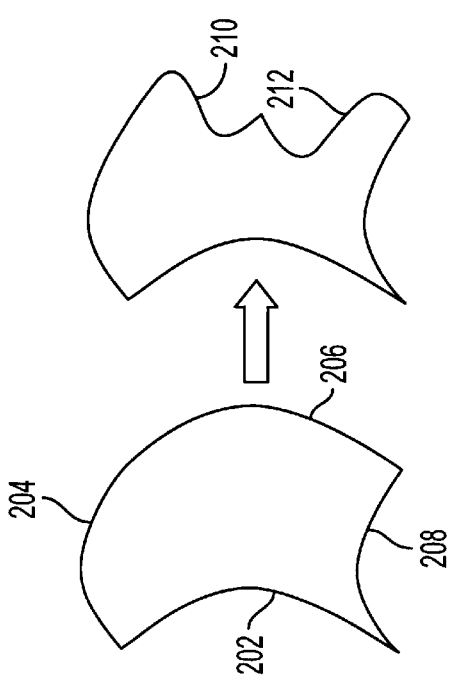
Figure 19C:
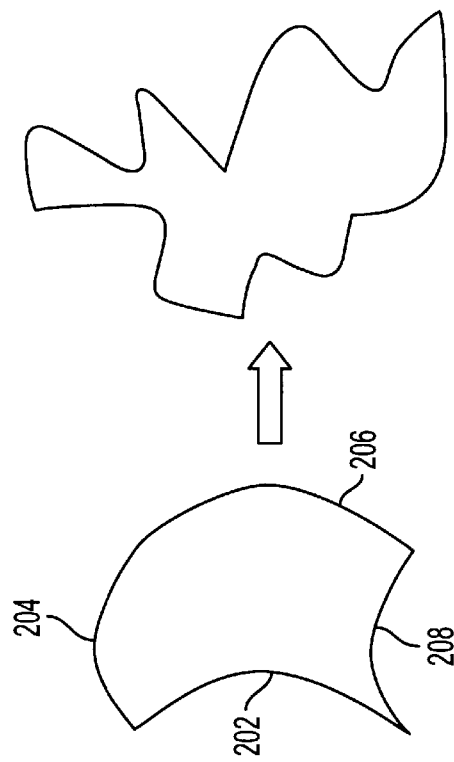
Figure 20:
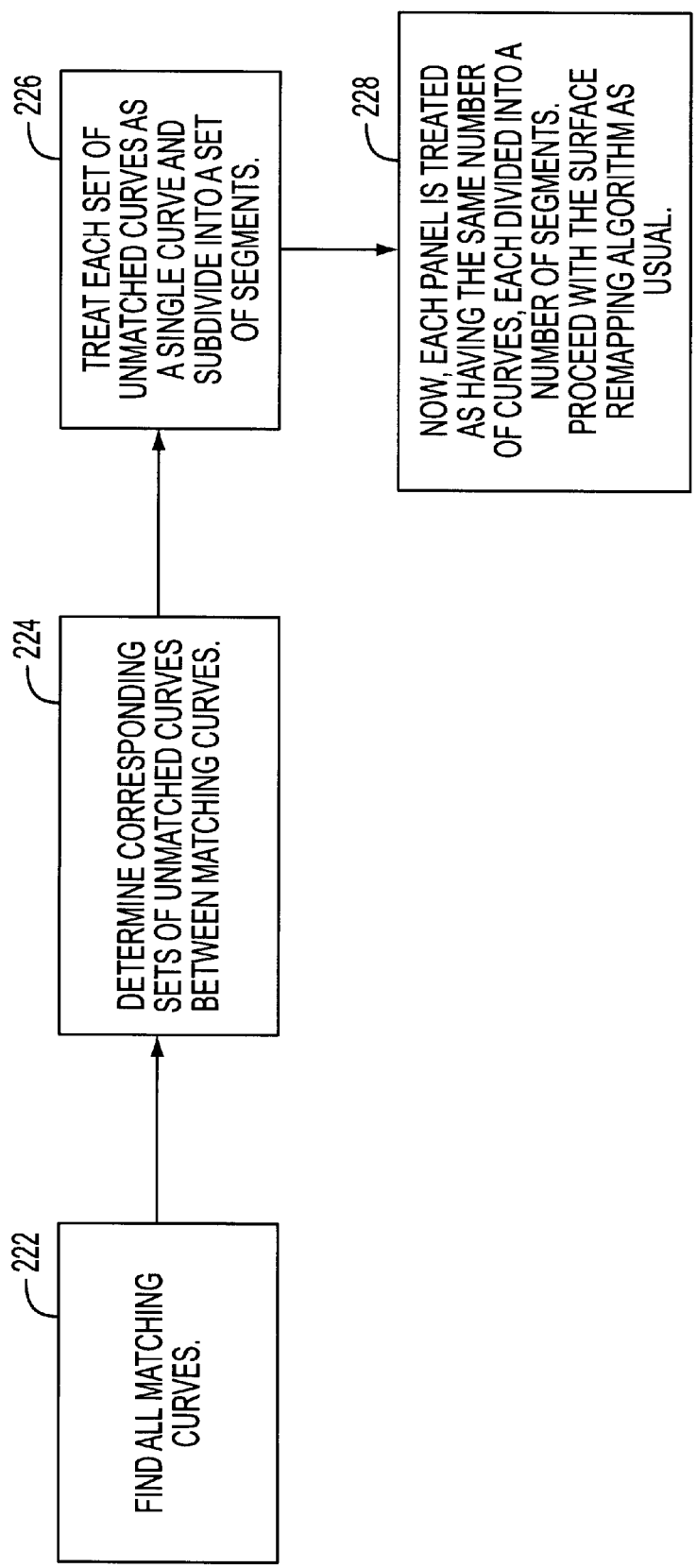
FIG. 20 shows a process of curve matching.

To illustrate the problem, FIGS. 19A–19C depict 3 scenarios. In each of the figures the original panel is defined by four curves 202, 204, 206 and 208. In FIG. 19A, one curve of the original panel (206) has been subdivided into two curves 210 and 212 whose shapes have changed from the original curve 206. In FIG. 19B, only one of the original curves 202 exists in the new panel. In FIG. 19C, all of the curves in the new panel are different from the curves in the old panel. An approach, as depicted in FIG. 20 is to search through the curves of the original panel looking for any curves which match 222 curves in the new panel. Once at least one curve has been matched, the rest of the curves can be matched more easily as the neighboring curves of the matched curves must be the ones which share the endpoints of the curves.

In FIG. 19A, three curves of the new panel match curves of the original panel. The remaining two curves must be paired with the last original curve. If there are no matching curves between the two panels, a comparison can be done between each curve in the new panel to each curve in the original panel, looking for a pair of curves which most closely match each other. A simple way to perform this comparison is to sample each curve an equal number of times to get a set of vertices which represent the curve. Then, for each pair of curves being compared, calculate the distance between the corresponding points of the two curves, square the value, and add it to a sum for the comparison. Now each curve comparison is denoted by a single value representing the relative closeness of the two curves. The values are squared to provide a weighting penalty to vertices that are farther away from each other. This is based on a common technique called the "least squares method" which is used most often to find a straight line which most closely runs through a set of points.

Once the closest matching pair of curves is determined, the system determines 224 corresponding sets of unmatched curves associated with the matched curves. In this operation the end points of known matched curves are used to determine new matched curves. Once one pair of curves is determined, the next pairs of curves must be the ones attached to the ends of the known matches. So the operation marches around one panel starting from an endpoint of a matched curve taking each curve in turn and matching it with curves around the other panel in the same direction starting from its matching curve. The lengths of the curves as they are encountered are used to help determine the matching. For example, suppose that the neighboring curve on one side of the matched curve on one panel is 3 units long and the neighboring curve on the same side of the matched curve on the other panel is one unit long and its neighbor is two units long. So both those curves will be matched to the first neighbor curve of 3 units. Because the lengths do not always work out so conveniently, the curves are subdivided into a number of segments so that fractions of a curve from one panel can be matched with a whole or fractional curve from the other panel.

Next, each curve in a set of unmatched curves is treated 226 as a single curve and each of these single curves is subdivided into a set of segments. Each panel is then treated 228 as if it had the same number of panels each divided into a number of segments. Consider two panels each composed of 7 curves, and after comparing all of the curves it is determined that the first curve of each panel match and that the fourth curve of each panel match. This would leave two sets of unmatched curves for each panel, the second and third curves and the fifth and sixth curves. So the process traverses the two sets of unmatched curves starting from the endpoint of the matching curve on one side of the span of unmatched curves to the starting point of the matching curve on the other side. As in the discussion above, if only one pair of curves is matched, all the rest of the curves in the panel form one set of unmatched curves which are traversed in the same manner as several small sets of unmatched curves separated by one or more matched curves. This closest match process is set forth in more detail in the Appendix.

Figure 21:
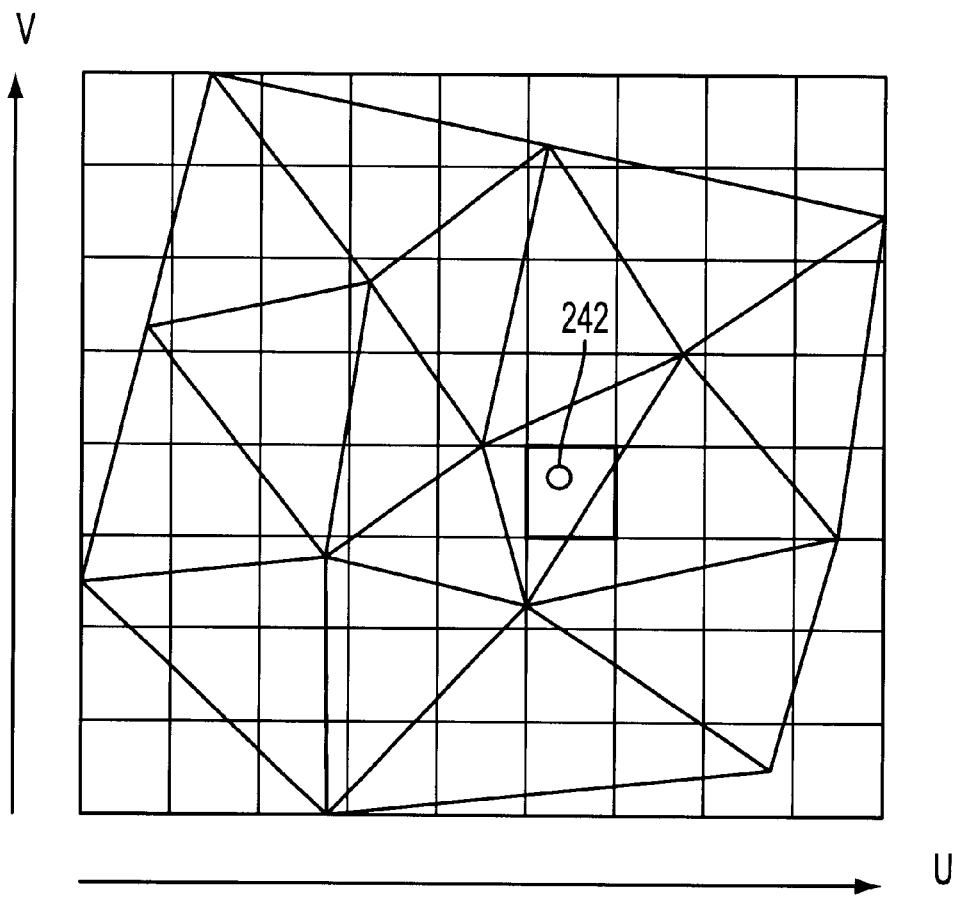
FIG. 21 depicts grid intersection.

A 2D intersection grid process is a process used for performing searches of 2 dimensional data that is arranged spatially. In the context of the surface remapping, the grid helps to answer the question, "Given an UV point in a panel, what is the triangle that contains that point?" FIG. 21 shows a 2D grid including a panel composed of 16 triangles and 13 vertices and its placement in a 2D grid. The 2D grid itself is no more than a data structure containing a two dimensional array of data elements, one for each cell in the grid. The size and resolution of the grid are determined by the bounding size of the panel and the number of triangles in the panel. The data in each cell is a list containing a pointer to each triangle which occupies some space in the cell. The grid cells are populated by visiting each triangle and storing a pointer to the triangle into the cells which the triangle occupies. This work is done in the BuildGrido method noted in the surface remapping process of the Appendix.

Once the grid has been built it can be used to locate triangles given an arbitrary UV point so that a new panel can be mapped to an old panel. Given the minimum and maximum U and V values which define the extent of the grid and the resolutions of the grid in the U and V directions, a calculation is performed to determine the grid cell occupied by an arbitrary UV point that lies within the extent of the grid. In FIG. 21, the UV point 242 is determined to be in the cell 6 cells in from the left and 4 cells up from the bottom. Then given a cell, a conventional 2D triangle intersection test is performed on each triangle in the cell's list for the one triangle which contains the triangle. This work is done in the GridIntersect( ) method of the Appendix.

The results of the triangle intersection test provide both whether a given UV point is inside or outside a triangle and the relative position inside the triangle of the UV point. This is shown below in FIG. 22.

Figure 22:
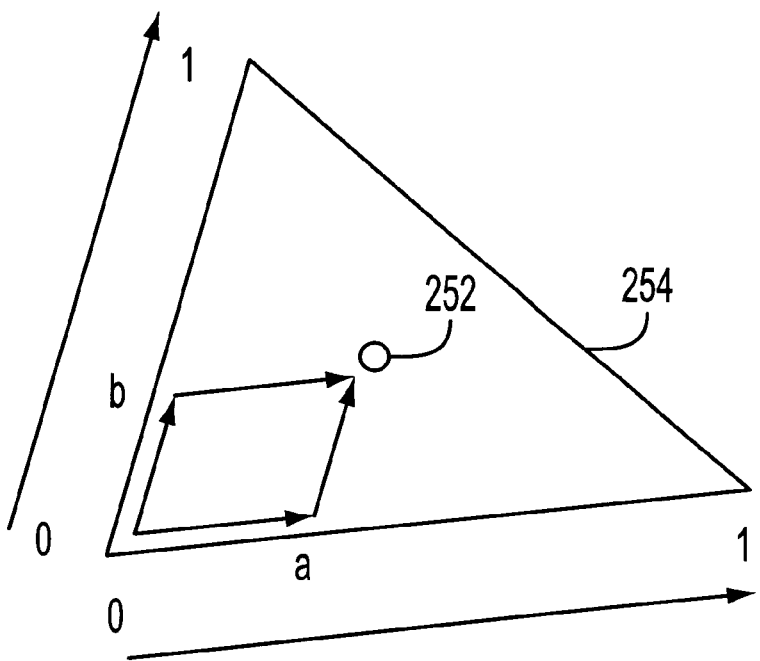
FIG. 22 illustrates point location determination.

FIG. 22 shows a point 252 inside a triangle 254. The space inside a triangle can be represented parametrically as a space between 0 and 1 along the directions formed by two of its edges. Any point inside the triangle can be represented as a coordinate in this space. The coordinate is determined by forming a parallelogram between the origin of the space and the point with lines parallel to the two edges forming the axes of the space. The parametric coordinate is expressed as a pair of numbers representing the fractional lengths of the sides of the parallelogram to the lengths of the axis edges. The above point (a, b) has a parametric coordinate of about (0.3, 0.3). This parametric coordinate is often referred as a UV or barycentric coordinate of the triangle. This work is done by the FindLocalUV( ) method in the pseudocode.

The advantage of determining a barycentric coordinate is that the coordinate can be used to interpolate any set of values associated with the vertices of the triangle. In the surface remapping process pseudocode, the barycentric coordinate is being used to interpolate between the XYZ positions of the triangle vertices inside the FindXYZ( ) method.

Figure 23B:
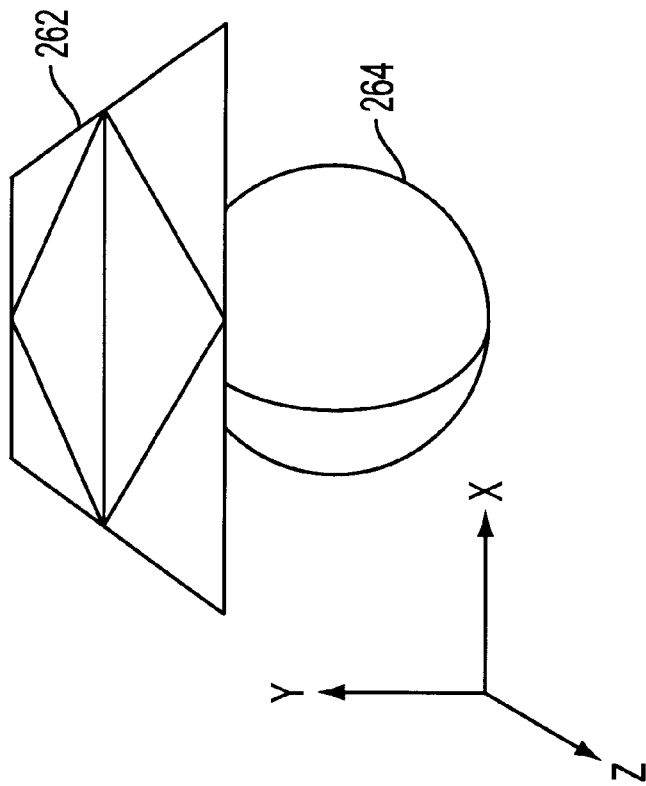
FIGS. 23–26 depict mapping.
Figure 23A:
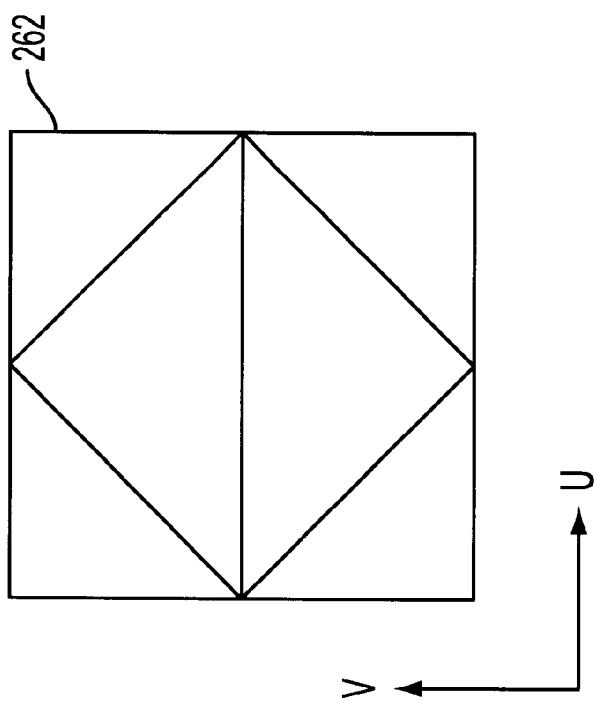
Figure 24:
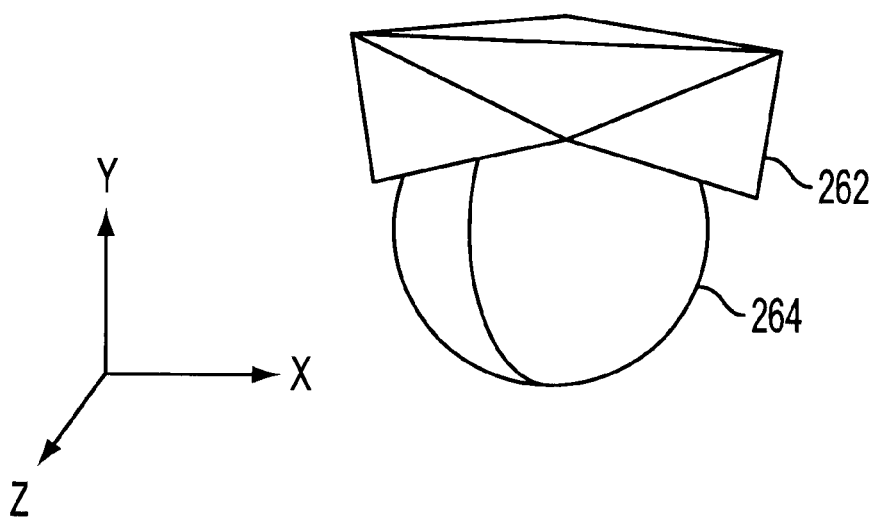

In surface remapping, a newly tessellated garment is mapped onto the existing 3D location of the original garment. The mapping is done independently for each panel of the new garment. This mapping will be described with a simple example. The example includes a single panel being simulated then modified. In FIG. 23, the original panel 262 is defined with two sets of coordinates, UV and XYZ and includes six sections and for purposes of simplicity each section is designed to be rigid with bending occurring around the joints or seams. In FIG. 24, the panel 262 has been conventionally simulated to settle on a sphere 264 and the panel bends at the joints. Now, the user makes a modification to a curve which defines a new panel 266 as shown below in FIG. 25. In this modification the bottom center vertex 267 is pulled down such as would occur when the length of the center of a garment is lengthened. The panel is retessellated or retriangulated creating a new vertex 272. The system now needs to find the location of this new vertex 272 in the original panel. This is where the pseudocode algorithm of the surface remapping process in the Appendix begins.

The line segments pairs a:A through h:H form the basis for mapping the vertices from the UV space of the new panel into the UV space of the original or old panel. The position of the vertices of the new panel are weighted by the distance from the vertex to the surrounding line segments. The vertices that fall on the line segments in the new panel will end up on the corresponding segments in the original panel as their transformations will be weighted by the segments in which they reside. For example vertex 268 in the new panel 266 between line segments a and b ends up as vertex 270 in the original panel located between line segments A and B. Vertices that do not lie on a segment will be weighted by the surrounding segments with the closer segments exerting more influence.

The vertex 272 in the middle of the panel will be affected by the transformations of all of the segments with the segments closer to the vertex exerting more influence to the final position of the vertex. From FIG. 25, it can be seen that the transformations of segment pairs a:A, b:B, e:E, f:F, g:G, and h:H tend to keep the vertex 272 in the same place, as there is no difference in position between the members of each of those segment pairs. In contrast, the segment pairs c:C and d:D tend to move the vertex 272 further up into the panel. Since the c and d segments are no more closer to the middle vertex 272 than the segments b and e and with the other segments trying to keep the vertex in its current location, the net result will be that the vertex 274 placed in the original panel 262 will only be slightly shifted upwards. The final UV positions of the vertices are shown on the right hand side in FIG. 25.

Figure 25:
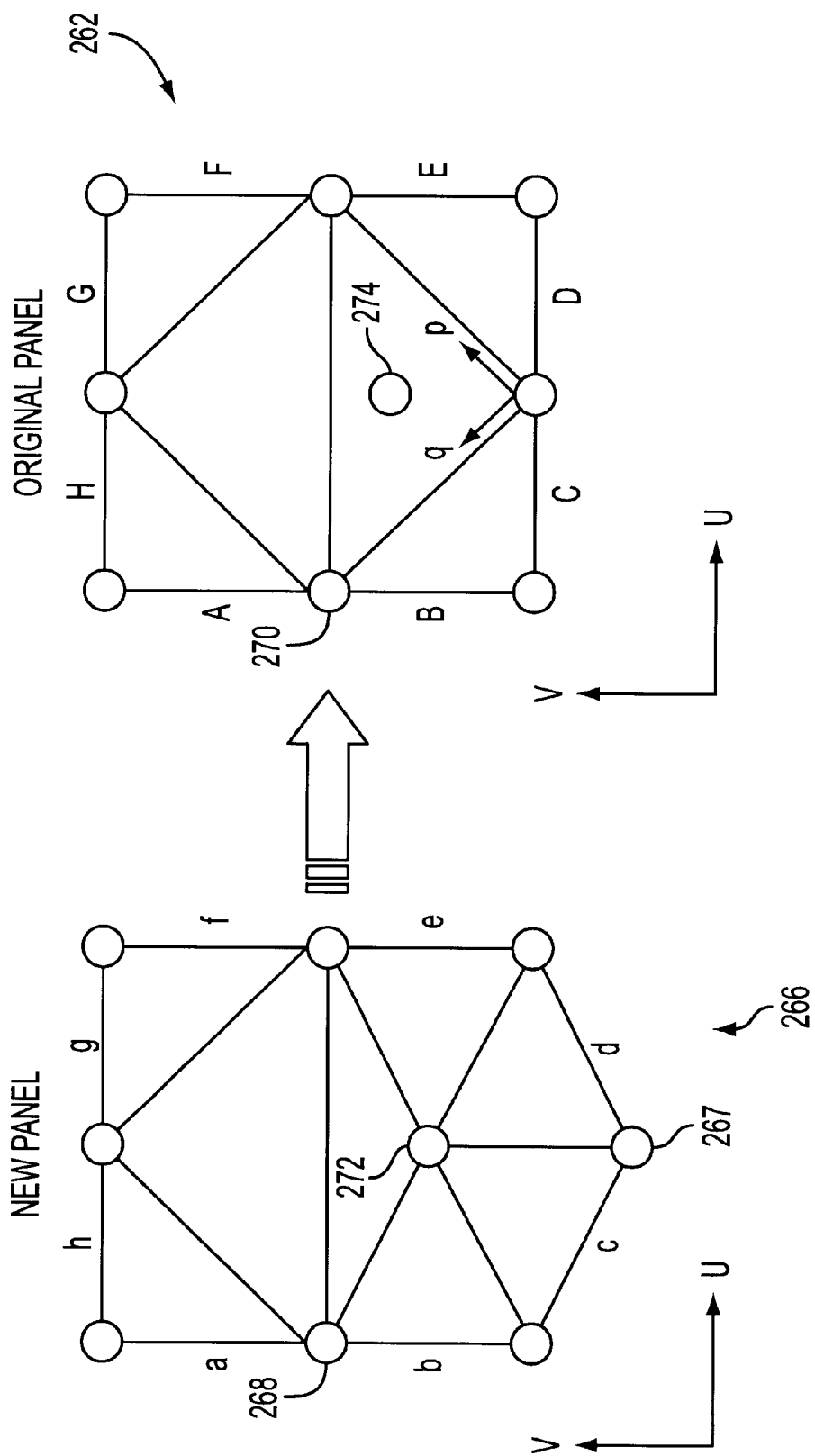
Figure 26B:
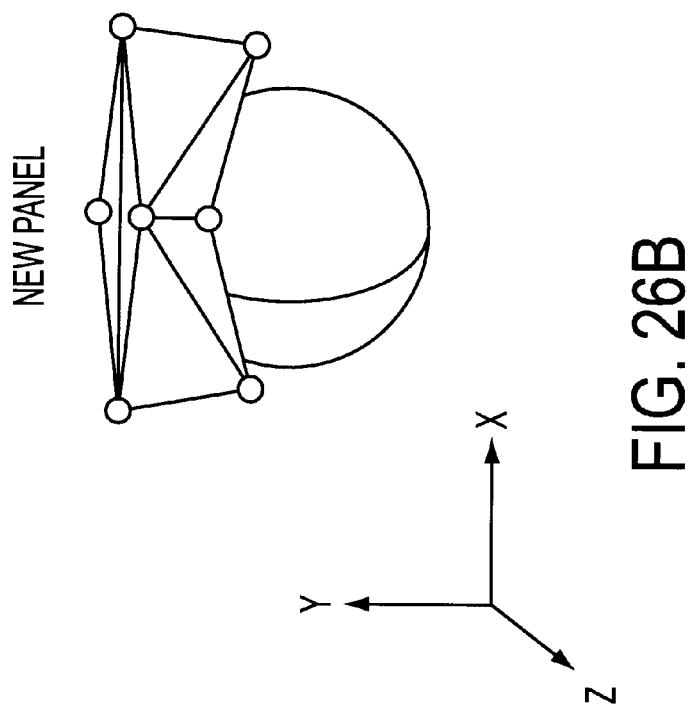
Figure 26A:
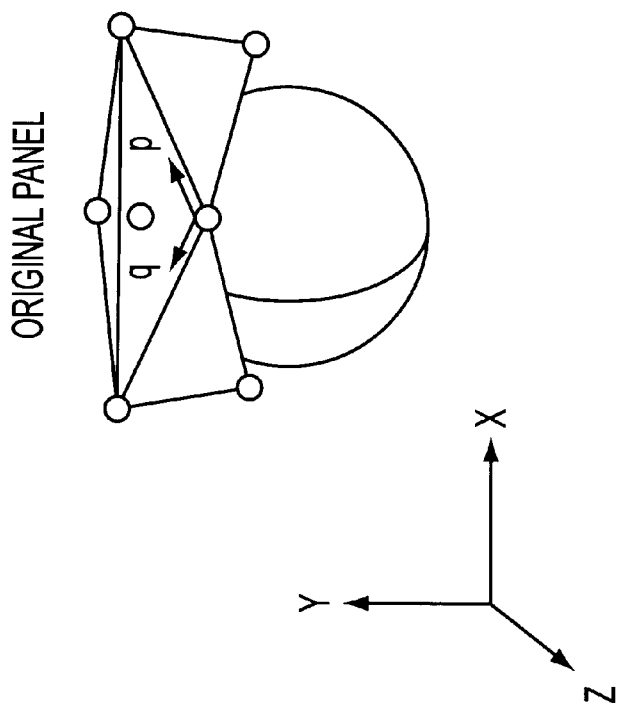

FIG. 26 shows the XYZ vertex positions of the new panel being generated. Each vertex has an XYZ position generated for it by conventionally determining the barycentric coordinate of the intersection location of the UV point inside the original panel and using that coordinate to interpolate the XYZ vertices at the corners of the intersecting triangle. Shown on the right side in FIG. 25 is the intersection of the middle vertex 274 into a triangle of the original panel and the associated barycentric coordinate (p, q). In FIG. 26 on the left hand side, the XYZ position of the middle vertex is determined from the XYZ positions of the intersecting triangle and (p,q). On the right hand side, the XYZ position of the middle vertex along with the XYZ positions of the other vertices are used with the triangle topology of the new panel to complete the remapping with the new vertex.

The new panel now takes up the same surface area as the original panel, resulting in some squashing in this case. The amount of squashing or stretching can be seen in the distances between the vertices from before the mapping to after the mapping from FIG. 25. This translates directly into a shortening or lengthening of the line segments connecting the vertices in the final new panel topology shown in FIG. 26. A subsequent simulation to relax the panel will allow the shorter segments to lengthen to the appropriate length and the longer segments to shorten to the appropriate length.

Figure 27A:
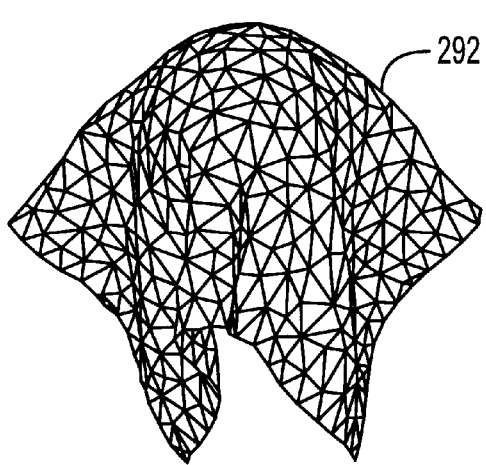
FIG. 27 illustrates two panels to be merged.
Figure 27B:
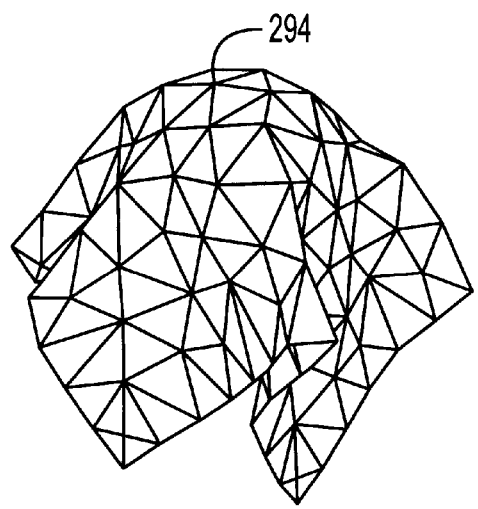

As discussed previously, during in-scene cloth modification it often becomes necessary to seam two panels together, both of which have been simulated. FIG. 27 shows two panels 292 and 294 which have been draped over two spheres. Notice that the panel 292 on the left has been tessellated or triangulated to a higher resolution than the panel on the right. When the panels are seamed, the panel on the right is retesselated to the higher resolution, relying on the surface remapping operation discussed previously to calculate XYZ positions for the vertices of the new tessellation. Note that seaming panels does not require that both panels become tessellated to the same resolution.

Figure 28:
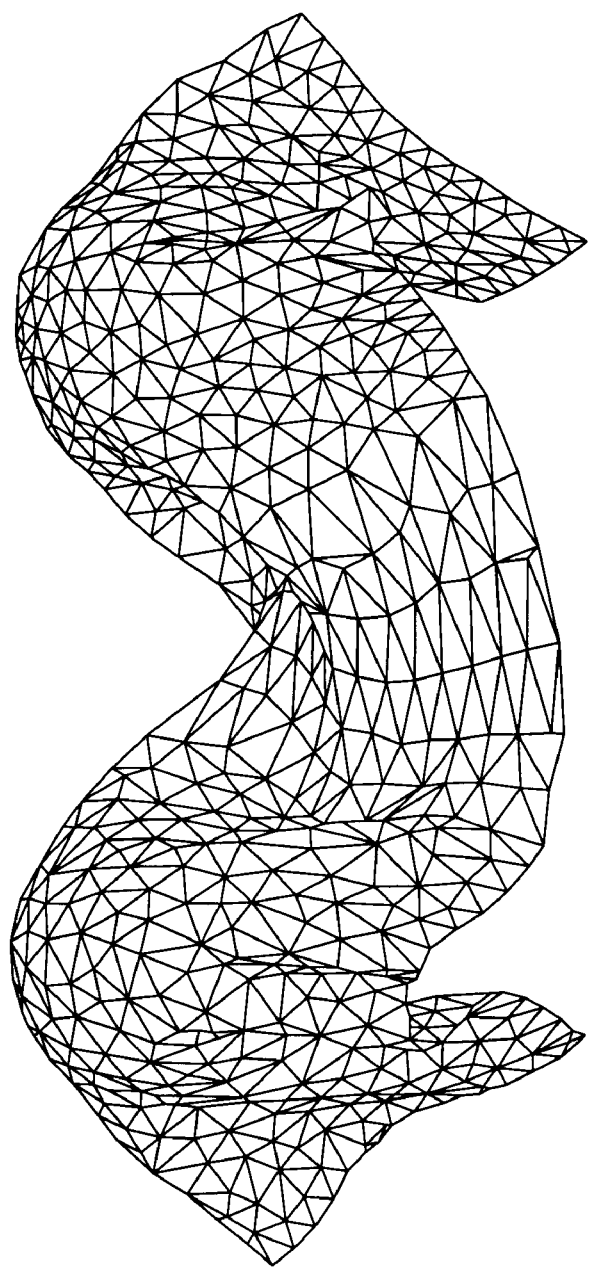
FIG. 28 illustrates merged panels.

FIG. 28 shows new cloth 296 which is the result of the seaming operation. The panel on the right has been retesselated to a higher resolution. In addition, the vertices along the two curves which are seamed have been merged together creating a single piece of cloth. To distribute the stretching that occurs when the seam vertices of the two panels are pulled together, the vertices near the seams are also pulled together somewhat. This can be seen in the area where the merge has occurred. The triangles in that vicinity are slightly larger than the triangles in the rest of the garment.

Figure 29:
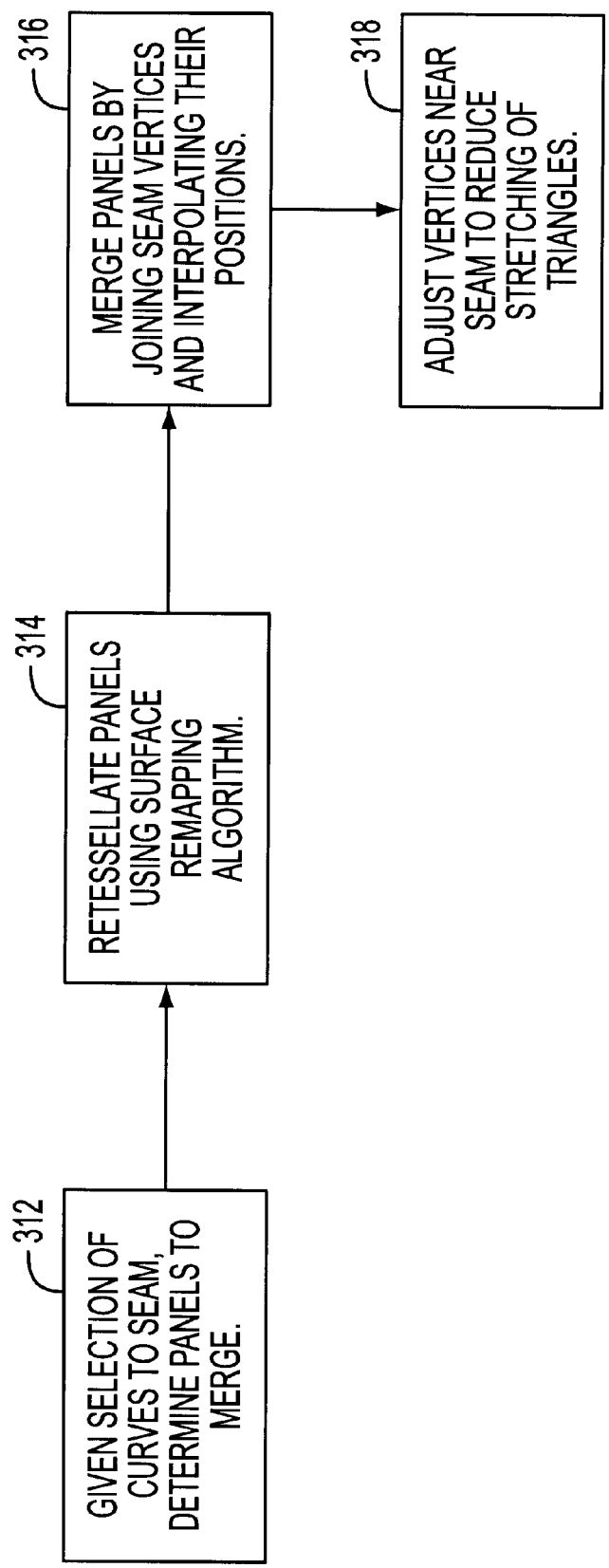
FIG. 29 depicts a merging process.

The seaming operation as depicted in FIG. 29 begins with a determination 312 of which panels to seam as discussed previously. Next, the panels are retesselated 314. The reason the panels must be retesselated is that the resolutions of the panels being seamed may be different and the associated seam curves of the two panels may be subdivided into different numbers of vertices. To merge the seams together, each seam curve must contain the same number of vertices. Therefore, one of the seam curves may have to be resubdivided to contain the same number of vertices as the other curve. The tessellation of a panel is computed by the line segments forming its boundary. If a curve along the boundary has been resubdivided, this changes the definition of the panel and it must be retessellated. The system then merges 316 the panels by joining the seam vertices and interpolating their positions. The vertices near the seam are then adjusted 318 to reduce the stretching of the triangles.

The stretching adjustment is performed by rounding in which vertex positions are moved from their original construction position along a graduated path towards the seam location. This results in a roughly circular round of the panel towards its companion panel to which it has been seamed. To merge two simulated panels along non-coincident seams, a morph is applied first to the two panels. Then the vertices of the morphed panel curves that will be seamed are interpolated to determine the target vertex locations for the round. The resulting mesh is thereby rounded from its simulated position.

The present invention has been described with respect to using an image warping algorithm to perform the mapping of UV points from the new panel to the old panel. Any algorithm that can take two dimensional points interior to a closed region and map them to unique locations in another closed region could be used. Imagine a rubber sheet encompassing the interior of a flexible wire loop, all in two dimensions. As the wire loop is bent and deformed the rubber sheet squashes and stretches to fill the space inside the loop. So the general problem being solved with the mapping is to take all of the points in the rubber sheet and find where they will go as the wire loop bends. Other mathematical techniques which will provide that answer can be used. Also, the 2D Intersection Grid algorithm is a fast and easy method for finding the triangles which occupy a set of 2D points. Other approaches could be substituted The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

```
Closest Match Process
This body of pseudocode is used to find a pair of matching curves
between
the original and new panels in the case where there is no obvious match.
The inputs to the code are the curves in both panels stored in arrays
CNew
and COriginal.
Let NUM_VERTICES = 10
// some number by which all curves will be sampled.
// First, generate a certain number of points along all of the curves and
// fill them into two arrays, PNew for the points of each of the curves
```

APPENDIX-continued

```
// in the new panel and POriginal for the points of each of the curves in
// the original panel. These points form a convenient way to compare
// one curve with another. The index I is used to distinguish the data
// of one curve from the data of another curve.
For each curve in new panel, CNew[I]
    Generate a number of sample points along CNew[I] and
    store the sample points into the array PNew[I]. The number
    of points to sample for each curve is denoted by the value
    of NUM_VERTICES.
Perform the same operation for the curves in COriginal, storing the values
into POriginal.
// Loop through each set of points in the new panel
// and compare it with each set of points the
// original panel.
An error value will be calculated for each pairing of sets of points in the
original panel with sets of points in the new panel. These error values will
be stored in a two dimensional array denoted Error[I, J] with I represent-
ing the particular set from the new panel and J representing the particular
set from the original panel.
For each set of points PNew[I] {
    For each set of points POriginal[J] {
        Initialize Error[I, J] = 0.0;
        // The error value between curve I of the new panel
        // and curve J of the original panel is determined by
        // calculating the distance between each pair of
        // sampled points of the two curves.
        // The distances are squared to give a higher
        // penalty the more the two points are different
        // These squares are all summed together to
        // arrive at the aggregate error or deviation.
        For each NUM_VERTICES points along
        both PNew[I] and POriginal[J] {
            Let P = next point in PNew[I]
            Let Q = next point in
            POriginal[J]
            Calculate D = distance between P
            and Q
            Add D * D to Error[I,J]
        }
    }
}
Search through all Error[I,J] for smallest value. Call its location
Error[A, B]. Determine matching curves to be CNew[A] and
COriginal[B] Surface Remapping Process
This body of pseudocode begins after a panel curve has been modified or
a
seam has been added or removed, and a new tessellation has occurred.
The
pseudocode describes the algorithm of mapping the newly tessellated
garment onto the existing 3D location of the original garment. The map-
ping is done independently to each panel of the new garment. Inputs to
the
pseudocode are the vertex XYZ and UV positions for all panels of both
the
original garment and the newly tessellated garment and the triangle
connectivity of both garments. Each panel knows the list of curves that
compose the panel as well as the tessellated vertices and edges along
each curve.
For each original garment panel PO {
    // Build a 2D grid to store the triangles
    // of PO for intersection testing.
    // This algorithm is described below.
    BuildGrid(PO);
}
For each new garment panel PN {
    Find corresponding original garment panel PO
    // Given PN and PO, generate a set of line
    // segment pairs which will be the source
    // and target segments for performing the
    // mapping. Here, assume that both PO
    // and PN have the same number of panel
    // curves.
    For each panel curve in PN, CN {
        Find the corresponding panel curve in
        PO, CO
        If (CO->numberOfEdges != CN-
        >numberOfEdges) {
            Let CF = curve with fewer edges
            Let CM = curve with more edges
```

APPENDIX-continued

```
        Sort edges of CF by length.
        While (CF->numberOfEdges < CM-
        >numberOfEdges) {
            Split longest edge of CF in
            half, thereby increasing
            The number of edges of CF
            by one.
        }
    }
    // Add these edges to the total set
    // of edges for PN and PO
    // called EdgesOfPN and EdgesOfPO.
}
// At this point, the perimeters of panels
// PO and PN are divided up into an equal
// number of segments. Each segment of PO
// is paired with its corresponding
// segment of PN and the set of pairs
// forms the basis of the mapping.
// The mapping of the new surface into the
// original surface is done by first
// transforming the UV values at each
// vertex of PN into the UV space
// defined by PO. The set of edge pairs
// define this transformation
For each vertex V of PN {
    UV = Transform(V->UV, EdgesOfPN,
    EdgesOfPO);
    // UV is a coordinate in the UV space
    // of PO. Now, an XYZ coordinate
    // must be found for vertex V. The
    // 2D intersection grid is used to
    // find the particular triangle of PO
    // which contains the transformed UV
    // point UV as well as the local
    // position inside the triangle of
    // the UV
    // point. The grid intersection
    // algorithm and FindLocalUV( )
    // methods are described below.
    Triangle GridIntersect(UV, PO);
    TriUV = FindLocalUV(Triangle, UV);
    // Finally the XYZ coordinate can be
    // calculated by using the local UV
    // to interpolate between the XYZ
    // coordinates of the triangle. This
    // is described below.
    XYZ = FindXYZ(Triangle, TriUV);
    }
}
```

What is claimed is:

1. A system, comprising:
an input device allowing a user to specify shape change modifications to cloth;
a display displaying a scene having an object associated with the cloth; and
a computer, coupled to said input device and said display, modifying a shape of the cloth in the scene responsive to the shape change modifications specified by the user.

2. A system as recited in claim 1, wherein said computer animates the object in the scene, said input device inputs the shape change modifications at a step in the animation and said computer modifies the cloth responsive to the shape change modifications at the step in the animation.

3. A system as recited in claim 1, wherein the cloth is specified by a cloth definition and said shape change modifications are made to the cloth definition.

4. A system as recited in claim 3, wherein said computer maps the shape change modifications from the cloth definition to the in-scene cloth.

5. A system, comprising:
an input device allowing a user to specify modifications to cloth, the cloth being specified by a cloth definition and the modifications being made to the cloth definition;
a display displaying a scene having an object associated with the cloth; and
a computer, coupled to said input device and said display, modifying the cloth in the scene responsive to the modifications specified by the user, said computer mapping the modifications from the cloth definition to the in-scene cloth,
wherein said mapping comprises morphing panels of the definition into panels of the in-scene cloth.

6. A system, comprising:
an input device allowing a user to specify modifications to cloth, the cloth being specified by a cloth definition and the modifications being made to the cloth definition;
a display displaying a scene having an object associated with the cloth; and
a computer, coupled to said input device and said display, modifying the cloth in the scene responsive to the modifications specified by the user, said computer mapping the modifications from the cloth definition to the in-scene cloth,
wherein said computer positions new vertexes of a modified panel in a corresponding panel of the in-scene cloth.

7. A system, comprising:
an input device allowing a user to specify modifications to cloth, the cloth being specified by a cloth definition and the modifications being made to the cloth definition;
a display displaying a scene having an object associated with the cloth; and
a computer, coupled to said input device and said display, modifying the cloth in the scene responsive to the modifications specified by the user, said computer mapping the modifications from the cloth definition to the in-scene cloth,
wherein said computer positions new vertexes of a modified panel in a corresponding panel of the in-scene cloth, and said computer rounds non-coincident merged panels.

8. A system as recited in claim 1, wherein said computer retessellates the cloth when material is added or removed.

9. A system as recited in claim 1, wherein said computer retessellates the cloth when panels of a same or different resolution are added or removed from the cloth.

10. A system, comprising:
an input device allowing a user to specify modifications to cloth, the cloth being specified by a cloth definition and the modifications being made to the cloth definition;
a display displaying a scene having an object associated with the cloth; and
a computer, coupled to said input device and said display, modifying the cloth in the scene responsive to the modifications specified by the user, said computer mapping the modifications from the cloth definition to the in-scene cloth,
wherein said computer divides and merges curves in cloth panels of the definition and the in-scene cloth to have a same number of curves.

11. A system, comprising:
an input device allowing a user to specify modifications to cloth, the cloth being specified by a cloth definition and the modifications being made to the cloth definition;
a display displaying a scene having an object associated with the cloth; and
a computer, coupled to said input device and said display, modifying the cloth in the scene responsive to the modifications specified by the user, said computer mapping the modifications from the cloth definition to the in-scene cloth, wherein said computer retessellates the cloth when the resolution of the cloth or panel is changed.

12. A system for modifying a garment on a character interacting in a scene, the garment being specified by a garment definition, said system comprising:

an input device allowing a user to specify modifications to the garment;

a display displaying the scene having a character associated with the garment; and a computer, coupled to said input device and said display, animating the character in the scene, said input device inputting the modifications at a step in the animation and said computer regenerating the garment in the scene responsive to the modifications by modifying the garment definition and mapping the modifications from the garment definition to the in-scene garment by morphing panels of the definition into panels of the in-scene garment and positioning new vertexes of a modified panel in a corresponding panel of the in-scene garment, retessellating the garment when material is added or removed and when panels of a same or different resolution are added or removed from the garment.

13. A process, comprising:

specifying shape change modifications to cloth formed of panels and associated with a character in a scene; and morphing a shape of the panels of the cloth in the scene responsive to the shape change modifications specified by the user, and joining the panels.

14. A computer readable storage including a process for controlling a computer by allowing specification of shape change modifications to cloth associated with a character in a scene and modifying a shape of the cloth in the scene responsive to the shape change modifications specified by the user.

15. A system, comprising:

an input device allowing a user to specify modifications to cloth;

a display displaying a scene having an object associated with the cloth; and a computer, coupled to said input device and said display, morphing the cloth in the scene responsive to the modifications specified by the user and animating at least one of the object and a viewing direction of the object to view the object having the cloth thereon from any angle.

16. A system, comprising:

an input device allowing a user to specify modifications to cloth having a cloth definition comprising a physical definition of an entire surface of the cloth;

a display displaying a scene having an object associated with the cloth; and a computer, coupled to said input device and said display, morphing the entire surface of the cloth in the scene responsive to the modifications specified by the user and the cloth definition.

* * * * *

UNITED STATES PATENT AND TRADEMARK OFFICE
CERTIFICATE OF CORRECTION

PATENT NO. : 6,462,740 B1
DATED : October 8, 2002
INVENTOR(S) : David Stanley Immel It is certified that error appears in the above-identified patent and that said Letters Patent is hereby corrected as shown below:

Column 13,
Line 48, after "cloth", insert -- formed of panels --
Line 52, delete "modifying", insert -- morphing --
Line 52, after "of" insert -- the panels --
Line 53, after "user," insert -- and joining the panels --

Column 15,
Line 3, after "cloth" insert -- formed of panels and --
Line 4, delete "modifying", insert -- morphing --
Line 6, after "shape" insert -- of the panels --
Line 9, after "user" insert -- and joining the panels --

Signed and Sealed this

Seventeenth Day of June, 2003

JAMES E. ROGAN
*Director of the United States Patent and Trademark Office*